(12) United States Patent
Jeong et al.

(10) Patent No.: US 12,554,348 B2
(45) Date of Patent: Feb. 17, 2026

(54) DISPLAY DEVICE

(71) Applicant: Samsung Display Co., Ltd., Yongin-Si (KR)

(72) Inventors: Sam Tae Jeong, Yongin-si (KR); Joon Yong Park, Yongin-si (KR); Joon Woo Bae, Yongin-si (KR); Hyun Eok Shin, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/600,844

(22) Filed: Mar. 11, 2024

(65) Prior Publication Data

US 2025/0060844 A1 Feb. 20, 2025

(30) Foreign Application Priority Data

Aug. 16, 2023 (KR) .................. 10-2023-0107175

(51) Int. Cl.
*G06F 3/041* (2006.01)
*G06F 3/044* (2006.01)

(52) U.S. Cl.
CPC .......... *G06F 3/0412* (2013.01); *G06F 3/0446* (2019.05); *G06F 2203/04103* (2013.01)

(58) Field of Classification Search
CPC ................ G06F 3/0412; G06F 3/0446; G06F 2203/04103; G06F 2203/04112; G06F 3/0443; G06F 3/0445; G06F 3/047; G06F 2203/04111; G06F 3/044–0448; G06F 2203/041–04114; G06F 3/041–04186; H10K 59/40; H10K 50/844; H10K 59/00; H10K 59/1201; H10K 59/131; H10K 59/38; H10K 59/844; H10K 59/8731; H10K 59/8792; H10K 71/00; H10K 71/60; H10K 2102/00; H10K 59/122;
(Continued)

(56) References Cited

U.S. PATENT DOCUMENTS 9,245,966 B2 1/2016 Park et al.
9,911,792 B2 3/2018 Kashiwabara et al.
(Continued)

FOREIGN PATENT DOCUMENTS

EP 1672962 A1 6/2006
JP H10-321606 A 12/1998
(Continued)

*Primary Examiner* — Amr A Awad
*Assistant Examiner* — Aaron Midkiff
(74) *Attorney, Agent, or Firm* — Innovation Counsel LLP

(57) ABSTRACT

A display device includes a substrate including an emission area and a non-emission area; a thin film transistor layer positioned on the substrate; a touch buffer layer positioned on the thin film transistor layer; a connection electrode positioned on the touch buffer layer; a touch insulating layer positioned on the connection electrode; a first electrode positioned on the touch insulating layer, and overlapping the non-emission area; and a first touch sacrificial layer positioned between the touch insulating layer and the first electrode, wherein the first touch sacrificial layer does not overlap the emission area, and is positioned in an island shape while overlapping the non-emission area, and an inclination angle formed between the touch insulating layer and a side surface of the first touch sacrificial layer has an acute angle.

19 Claims, 20 Drawing Sheets

(58) Field of Classification Search
CPC ......... H10K 59/12–129; H10K 59/126; H10K 59/127; H10K 59/173; H10K 59/80; H10K 59/87; H10K 59/873; H10K 50/84; H10K 50/87; H10K 50/873; H10K 59/1213; H10K 59/1315; H10K 59/805; G02F 1/13338; G02F 1/134309; G02F 1/13439; G02F 1/136286; G02F 1/13629; G02F 1/136295; G02F 1/1368; G02F 2203/02; H01L 27/124; H01L 71/60; C23F 1/00–46; G09G 3/32–3291
See application file for complete search history.

(56) References Cited

U.S. PATENT DOCUMENTS

| | | | | |
|---|---|---|---|---|
| 2005/0254289 | A1* | 11/2005 | Nakajima | H10N 50/10 |
| | | | | 365/158 |
| 2017/0256593 | A1* | 9/2017 | Jung | H10K 59/122 |
| 2020/0273922 | A1* | 8/2020 | Park | G06F 1/1652 |
| 2020/0310584 | A1* | 10/2020 | Hirano | G06F 3/0445 |
| 2021/0200365 | A1* | 7/2021 | Lee | H10K 50/865 |
| 2024/0130188 | A1 | 4/2024 | Shin et al. | |

FOREIGN PATENT DOCUMENTS

| | | |
|---|---|---|
| KR | 10-2012-0097152 A | 9/2012 |
| KR | 10-2024-0054434 A | 4/2024 |

\* cited by examiner

RE: RE1
184: 184A

RE: RE1, RE2, RE3
184: 184A

BML: B1, B2
GE: G1, G2

DISPLAY DEVICE

CROSS-REFERENCE TO RELATED APPLICATION

This application claims priority to Korean Patent Application No. 10-2023-0107175 filed on Aug. 16, 2023, in the Korean Intellectual Property Office, and all the benefits accruing therefrom under 35 U.S.C. 119, the contents of which in its entirety are herein incorporated by reference.

BACKGROUND

1. Technical Field

The present disclosure relates to a display device.

2. Description of the Related Art

With the advance of information-oriented society, more and more demands are placed on display devices for displaying images in various ways. For example, display devices are employed in various electronic devices such as smartphones, digital cameras, laptop computers, navigation devices, and smart televisions. The display device may be a flat panel display device such as a liquid crystal display device, a field emission display device and an organic light emitting display device. Among the flat panel display devices, self-luminous display device which includes a light emitting element capable of emitting light by itself may display an image without a backlight unit providing light to the display panel.

SUMMARY

Aspects of the present disclosure provide a display device including low resistance wiring capable of high-resolution and high-speed driving.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

A display device comprises a substrate comprising an emission area and a non-emission area; a thin film transistor layer positioned on the substrate; a touch buffer layer positioned on the thin film transistor layer; a connection electrode positioned on the touch buffer layer; a touch insulating layer positioned on the connection electrode; a first electrode positioned on the touch insulating layer, and overlapping the non-emission area; and a first touch sacrificial layer positioned between the touch insulating layer and the first electrode, wherein the first touch sacrificial layer does not overlap the emission area, and is positioned in an island shape while overlapping the non-emission area, and an inclination angle formed between the touch insulating layer and a side surface of the first touch sacrificial layer has an acute angle.

A display may further comprise a touch protection layer positioned on the first electrode, wherein the side surface of the first touch sacrificial layer may be in contact with the touch protection layer.

A display may further comprise the first touch sacrificial layer may further comprise a first surface facing the touch insulating layer and a second surface facing the first electrode, the first surface is in contact with the touch insulating layer, and the second surface may be in contact with the first electrode.

The first touch sacrificial layer may be at least one selected from the group consisting of silicon nitride, silicon oxynitride, and silicon oxide.

The first electrode may include at least one conductive layer, and the first electrode contains copper.

The first electrode may be completely overlapped with the first touch sacrificial layer in a plan view, and the first touch sacrificial layer is completely overlapped with the touch insulating layer in a plan view.

In a plan view, the first electrode and the first touch sacrificial layer may have a mesh shape to expose the emission area.

A display may further comprise a second electrode positioned on the touch insulating layer in the non-emission area, and spaced apart from the first electrode with the emission area interposed therebetween, wherein the second electrode is electrically connected to the connection electrode through a touch contact hole.

The first touch sacrificial layer may comprise a first portion overlapped with the first electrode and a second portion overlapped with the second electrode, and the second portion of the first touch sacrificial layer has an island shape between the second electrode and the touch insulating layer.

The second portion of the first touch sacrificial layer may completely surrounds the touch contact hole in a plan view.

The second portion may not be positioned on the touch contact hole.

A display may further comprise a second touch sacrificial layer positioned between the touch buffer layer and the connection electrode, wherein the second touch sacrificial layer may be in contact with the touch buffer layer and the connection electrode, the second touch sacrificial layer may have an island shape while overlapped with the connection electrode, and an inclination angle formed between the touch buffer layer and a side surface of the second touch sacrificial layer may has an acute angle.

In a plan view, the connection electrode may be completely overlapped with by the second touch sacrificial layer, and in a plan view, the second touch sacrificial layer may be completely overlapped with the touch buffer layer.

The thin film transistor layer may comprise a first buffer layer; a third electrode positioned on the first buffer layer; and a first sacrificial layer positioned between the first buffer layer and the third electrode, wherein an inclination angle formed between the first buffer layer and a side surface of the first sacrificial layer may has an acute angle.

The first sacrificial layer may have an island shape while overlapped with the third electrode.

A display device comprises a substrate a substrate comprising an emission area and a non-emission area; a thin film transistor layer positioned on the substrate; a touch buffer layer positioned on the thin film transistor layer; a connection electrode positioned on the touch buffer layer; a touch insulating layer positioned on the connection electrode; a first electrode positioned on the touch insulating layer, and overlapping the non-emission area; a touch protection layer positioned on the first electrode; and a first touch sacrificial layer positioned between the touch insulating layer and the first electrode, wherein the first touch sacrificial layer comprises a first portion overlapping the emission area and the non-emission area and a second portion overlapping the first electrode and protruding toward the first electrode.

The second portion of the first touch sacrificial layer may be in contact with the first electrode.

The second portion may comprise side surfaces facing the touch protection layer, and an inclination angle formed between a side surface of the second portion of the first touch sacrificial layer and the touch insulating layer may has an acute angle.

A display device may further comprise a second electrode positioned on the touch insulating layer in the non-emission area, and spaced apart from the first electrode with the emission area interposed therebetween, wherein the first touch sacrificial layer further comprises a third portion overlapping the second electrode and protruding toward the second electrode, and an inclination angle formed between a side surface of the third portion facing the touch protection layer and the touch insulating layer may has an acute angle.

The second portion and the third portion overlap the non-emission area may be spaced apart from each other with the emission area interposed therebetween, and the second portion and the third portion are connected by the first portion.

The display device according to one embodiment may provide a metal electrode capable of realizing a high-resolution product by providing an inorganic film with a low film density under the metal electrode.

However, effects according to the embodiments of the present disclosure are not limited to those exemplified above and various other effects are incorporated herein.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE EMBODIMENTS

Figure 1:
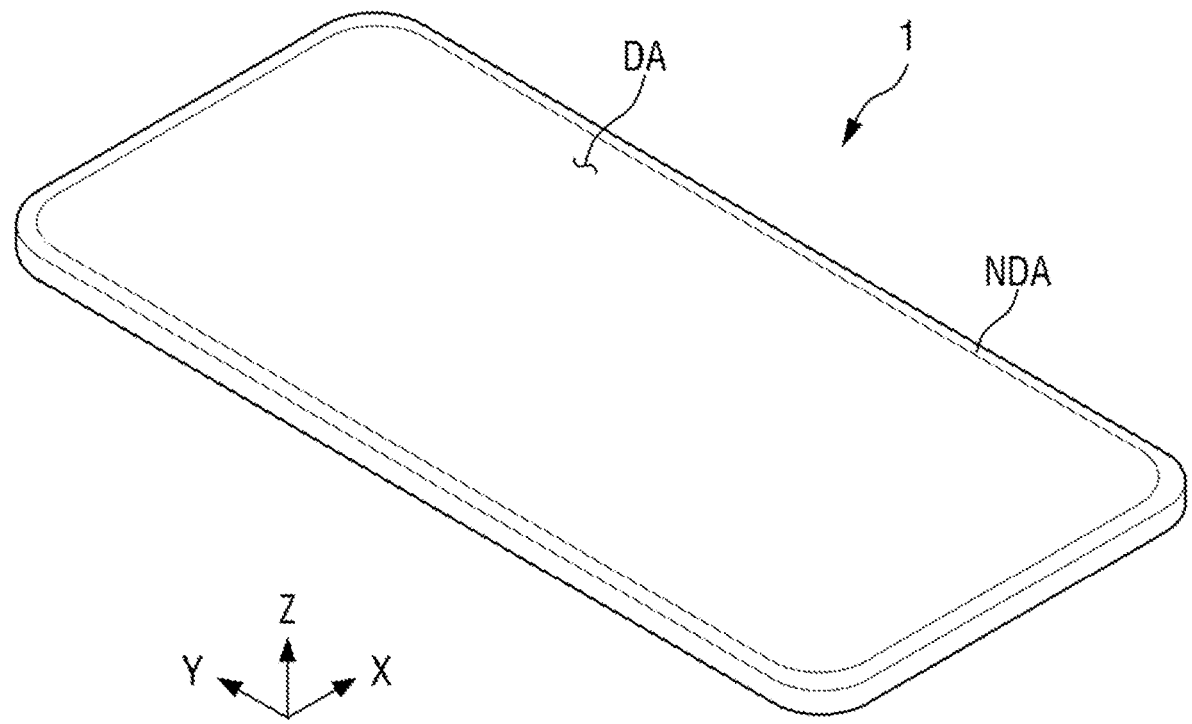
FIG. 1 is a schematic perspective view of an electronic device according to one embodiment.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the disclosure, numerous specific details are set forth in order to provide a thorough understanding of the disclosure. However, it will be understood that the disclosure may be practiced without these specific details. In other instances, well-known methods, procedures, components, and circuits have not been described in detail so as not to unnecessarily obscure aspects of the disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the disclosure as defined by the appended claims.

A shape, a size, a percentage, an angle, a number, etc. disclosed in the drawings for describing embodiments of the disclosure are illustrative, and the disclosure is not limited thereto. The same reference numerals refer to the same elements herein. Further, descriptions and details of well-known steps and elements are omitted for simplicity of the description. Furthermore, in the following detailed description of the disclosure, numerous specific details are set forth in order to provide a thorough understanding of the disclosure. However, it will be understood that the disclosure may be practiced without these specific details. In other instances, well-known methods, procedures, components, and circuits have not been described in detail so as not to unnecessarily obscure aspects of the disclosure.

The terminology used herein is for the purpose of describing particular embodiments only and is not intended to limit the disclosure. As used herein, the singular constitutes "a" and "an" are intended to include the plural constitutes as well, unless the context clearly indicates otherwise. It will be further understood that the terms "comprises," "comprising," "includes," and "including," when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the disclosure.

In addition, it will also be understood that when a first element or layer is referred to as being "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be. In addition, it will also be understood that when an element or layer is referred to as being "between" two elements or layers, it may be the only element or layer between the two elements or layers, or one or more intervening elements or layers may also be.

Further, as used herein, when a layer, film, region, plate, or the like is disposed "on" or "on top" of another layer, film, region, plate, or the like, the former may directly contact the latter or still another layer, film, region, plate, or the like may be disposed between the former and the latter. As used herein, when a layer, film, region, plate, or the like is directly disposed "on" or "on top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain embodiment may be implemented differently, a function or operation specified in a specific block may occur in a sequence different from that specified in a flowchart. For example, two consecutive blocks may actually be executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated.

The features of the various embodiments of the disclosure may be partially or entirely combined with each other, and may be technically associated with each other or operate with each other. The embodiments may be implemented independently of each other and may be implemented together in an association relationship.

Spatially relative terms, such as "beneath," "below," "lower," "under," "above," "upper," and the like, may be used herein for ease of explanation to describe one element or feature's relationship to another element or feature as illustrated in the figures. It will be understood that the spatially relative terms are intended to encompass different orientations of the device in use or in operation, in addition to the orientation depicted in the figures. For example, when the device in the drawings is turned over, elements described as "below" or "beneath" or "under" other elements or features would then be oriented "above" the other elements or features. Thus, the example terms "below" and "under" may encompass both an orientation of above and below. The device may be otherwise oriented for example, rotated 90 degrees or at other orientations, and the spatially relative descriptors used herein should be interpreted accordingly.

Hereinafter, specific embodiments will be described with reference to the accompanying drawings.

FIG. 1 is a schematic perspective view of an electronic device according to one embodiment.

Referring to FIG. 1, an electronic device 1 displays a moving image or a still image. The electronic device 1 may refer to any electronic device providing a display screen. Examples of the electronic device 1 may include a television, a laptop computer, a monitor, a billboard, an Internet-of-Things device, a mobile phone, a smartphone, a tablet personal computer (PC), an electronic watch, a smart watch, a watch phone, a head-mounted display, a mobile communication terminal, an electronic notebook, an electronic book, a portable multimedia player (PMP), a navigation device, a game machine, a digital camera, a camcorder and the like, which provide a display screen.

A first direction (X-axis direction), a second direction (Y-axis direction), and a third direction (Z-axis direction) are defined in FIG. 1. The first direction (X-axis direction) and the second direction (Y-axis direction) may be perpendicular to each other, the first direction (X-axis direction) and the third direction (Z-axis direction) may be perpendicular to each other, and the second direction (Y-axis direction) and the third direction (Z-axis direction) may be perpendicular to each other. It may be understood that the first direction (X-axis direction) refers to a horizontal direction in the drawing, the second direction (Y-axis direction) refers to a vertical direction in the drawing, and the third direction (Z-axis direction) refers to an upward and downward direction (i.e., a thickness direction) in the drawing. In the following specification, unless otherwise stated, "direction" may refer to both of directions extending along the direction. Further, when it is necessary to distinguish both "directions" extending in both sides, one side will be referred to as "one side in the direction" and the other side will be referred to as "the other side in the direction." Referring to FIG. 1, a direction indicated by an arrow is referred to as one side, and an opposite direction thereto is referred to as the other side.

Hereinafter, for simplicity of description, when referring to the electronic device 1 or the surfaces of each member constituting the electronic device 1, one surface through which the image is displayed is referred to as a top surface and the opposite surface of the one surface is referred to as the bottom surface. However, the present disclosure is not limited thereto, the top surface and the bottom surface may be referred to as a front surface and a rear surface, respectively, or may also be referred to as a first surface or a second surface, respectively. In addition, in describing the relative position of each of the members of the electronic device 1, one side of the third direction (Z-axis direction) may be referred to as an upper side and the other side of the third direction (Z-axis direction) may be referred to as a lower side.

Figure 2:
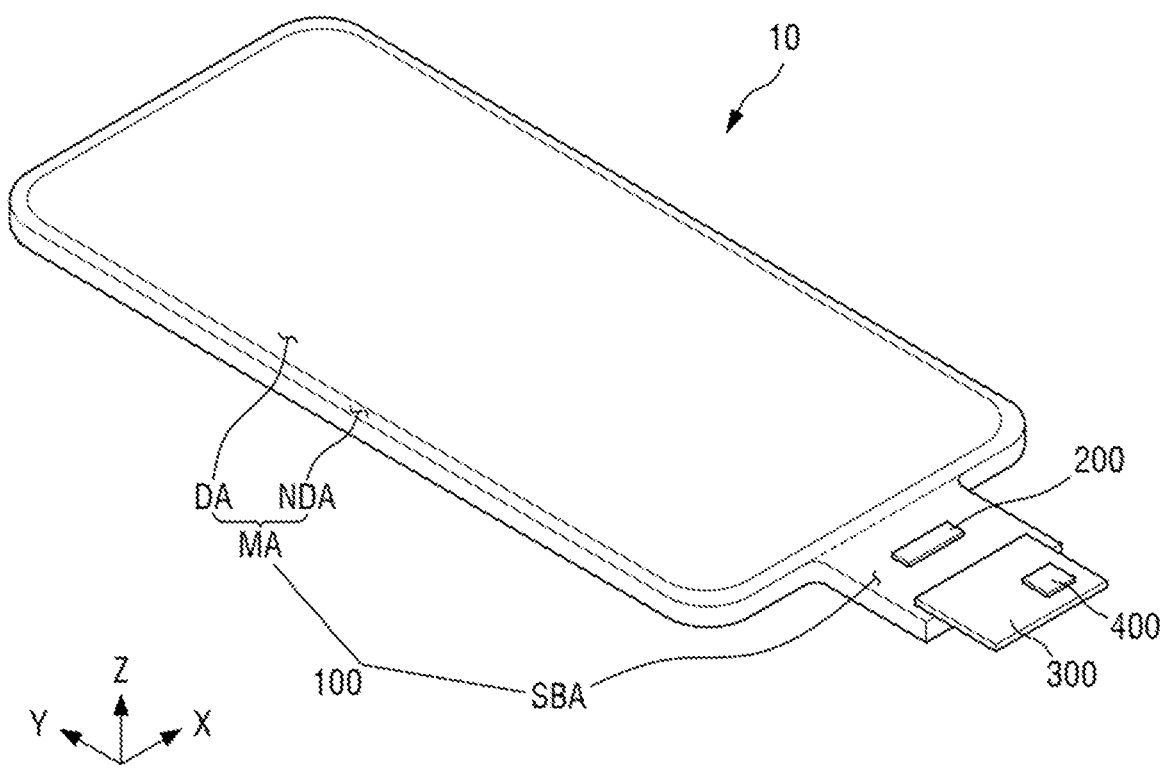
FIG. 2 is a perspective view illustrating a display device included in an electronic device according to one embodiment.

The electronic device 1 may include a display device 10 in FIG. 2 providing a display screen. Examples of the display device may include an inorganic light emitting diode display device, an organic light emitting display device, a quantum dot light emitting display device, a plasma display device and a field emission display device. In the following description, a case where an organic light emitting diode display device is applied as a display device will be exemplified, but the present disclosure is not limited thereto, and other display devices may be applied within the same scope of technical spirit.

The shape of the electronic device 1 may be variously modified. For example, the electronic device 1 may have a shape such as a rectangular shape elongated in a horizontal direction, a rectangular shape elongated in a vertical direction, a square shape, a quadrilateral shape with rounded corners (vertices), other polygonal shapes and a circular shape. The shape of a display area DA of the electronic device 1 may also be similar to the overall shape of the electronic device 1. FIG. 1 illustrates the electronic device 1 having a rectangular shape elongated in the second direction (Y-axis direction).

The electronic device 1 may include the display area DA and a non-display area NDA. The display area DA is an area where an image can be displayed, and the non-display area NDA is an area where the image is not displayed. The display area DA may also be referred to as an active region, and the non-display area NDA may also be referred to as a non-active region. The display area DA may substantially occupy the center of the electronic device 1.

FIG. 2 is a perspective view illustrating the display device 10 included in the electronic device according to one embodiment.

Referring to FIG. 2, the electronic device 1 according to one embodiment may include the display device 10. The display device 10 may provide a screen to the electronic device 1. The display device 10 may have a planar shape similar to the shape of the electronic device 1. For example, the display device 10 may have a shape similar to a rectangular shape having short sides in a first direction (X-axis direction) and long sides in a second direction (Y-axis direction) in a plan view. The edge where the short side in the first direction (X-axis direction) and the long side in the second direction (Y-axis direction) meet may be rounded to have a curvature, but the configuration of the display device 10 is not limited thereto and may be formed at a right angle. The planar shape of the display device 10 is not limited to a quadrilateral shape, and may be formed in a shape similar to another polygonal shape, a circular shape, or elliptical shape.

The display device 10 may include a display panel 100, a display driver 200, a circuit board 300, and a touch driver 400.

The display panel 100 may include a main region MA and a sub-region SBA.

The main region MA may include the display area DA including pixels displaying an image and the non-display area NDA disposed around the display area DA.

The display area DA may emit light through a plurality of opening areas or a plurality of emission areas to be described later. For example, the display panel 100 may include a pixel circuit including switching elements, a pixel defining layer defining an emission area or an opening area, and a self-light emitting element. For example, the self-light emitting element may include at least one of an organic light emitting diode (LED) including an organic light emitting layer, a quantum dot LED including a quantum dot light emitting layer, an inorganic LED including an inorganic semiconductor, or a micro LED, but the configuration of the self-light emitting element is not limited thereto. In the following drawings, an organic light emitting diode as the self-light emitting element is illustrated by way of example.

The non-display area NDA may be an area outside the display area DA. The non-display area NDA may an edge area of the main region MA of the display panel 100. A gate driver (not illustrated) that supplies gate signals to the gate lines, and fan-out lines (not illustrated) that connect the display driver 200 to the display area DA may be disposed in the non-display area NDA.

The sub-region SBA may be a region extending from one side of the main region MA. The sub-region SBA may include a flexible material which can be bent, folded or rolled. For example, when the sub-region SBA is bent, the sub-region SBA may overlap the main region MA in a thickness direction (e.g., the third direction (Z-axis direction)). The display driver 200 and a pad portion connected to the circuit board 300 may be disposed in the sub-region SBA. In another embodiment, the sub-region SBA may be omitted, and the display driver 200 and the pad portion may be positioned in the non-display area NDA.

The display driver 200 may output signals and voltages for driving the display panel 100. The display driver 200 may supply data voltages to data lines. The display driver 200 may supply a power voltage to the power line and may supply a gate control signal to the gate driver. The display driver 200 may be formed as an integrated circuit (IC) and mounted on the display panel 100 by a chip on glass (COG) method, a chip on plastic (COP) method, or an ultrasonic bonding method. For example, the display driver 200 may be disposed in the sub-region SBA, and may overlap the main region MA in the thickness direction by bending of the sub-region SBA. For another example, the display driver 200 may be mounted on the circuit board 300.

The circuit board 300 may be attached to the pad portion of the display panel 100 by using an anisotropic conductive film (ACF). Lead lines of the circuit board 300 may be electrically connected to a pad portion of the display panel 100. The circuit board 300 may be a flexible printed circuit board, a printed circuit board, or a flexible film such as a chip on film.

The touch driver 400 may be mounted on the circuit board 300. The touch driver 400 may be connected to a touch sensing unit of the display panel 100. The touch driver 400 may supply a touch driving signal to a plurality of touch electrodes of the touch sensing unit and may sense an amount of change in capacitance between the plurality of touch electrodes. For example, the touch driving signal may be a pulse signal having a predetermined frequency. The touch driver 400 may calculate whether an input is made and input coordinates based on an amount of change in capacitance between the plurality of touch electrodes. The touch driver 400 may be formed as an integrated circuit (IC).

Figure 3:
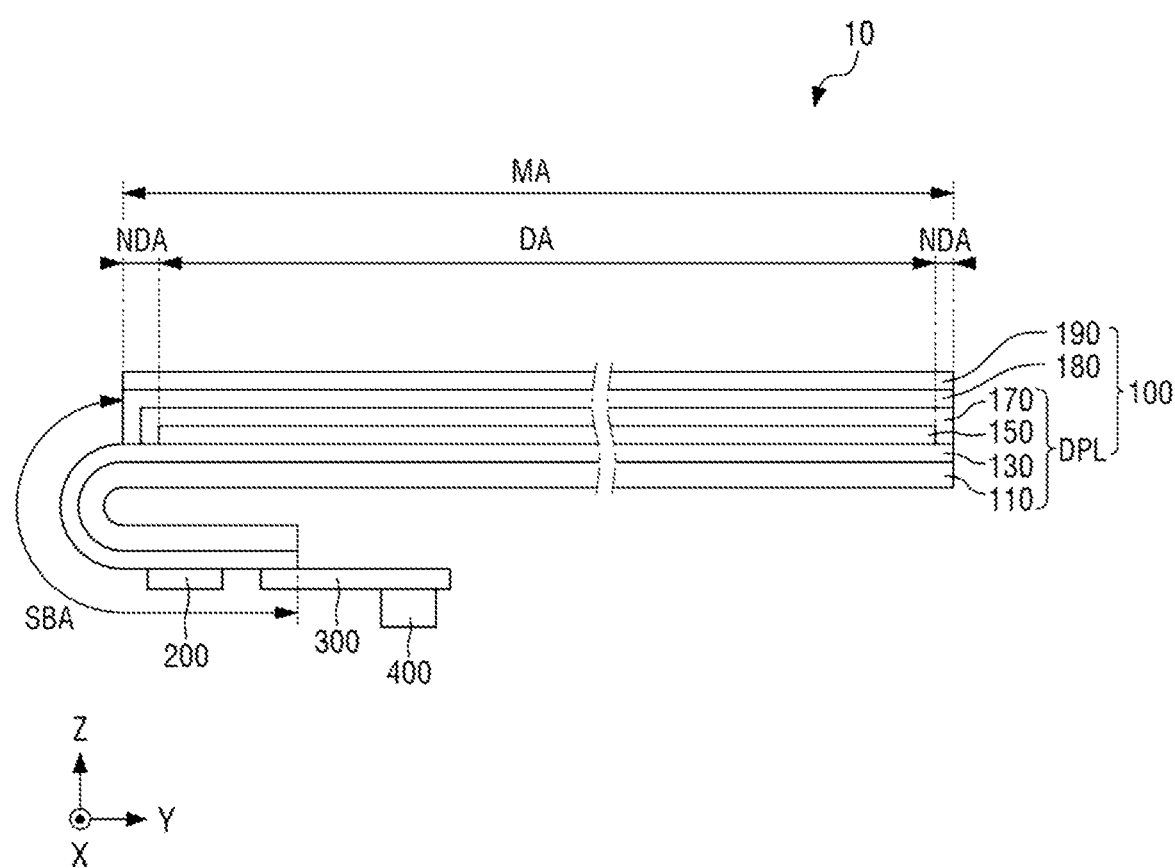
FIG. 3 is a cross-sectional view illustrating a schematic side view of the display device of FIG. 2.

FIG. 3 is a cross-sectional view illustrating a schematic side view of the display device 10 of FIG. 2.

Referring to FIG. 3, the display panel 100 may include a display layer DPL, a touch sensor layer 180, and a color filter layer 190. The display layer DPL may include a substrate 110, a thin film transistor layer 130, a light emitting element layer 150, and a thin film encapsulation layer 170.

The substrate 110 may be a base substrate or a base member. The substrate 110 may be a flexible substrate which can be bent, folded or rolled. For example, the substrate 110 may include a polymer resin such as polyimide (PI), but is not limited thereto. In another embodiment, the substrate 110 may include a glass material or a metal material.

The thin film transistor layer 130 may be disposed on the substrate 110. The thin film transistor layer 130 may include a plurality of thin film transistors constituting a pixel circuit of pixels. The thin film transistor layer 130 may further include gate lines, data lines, power lines, gate control lines, fan-out lines that connect the display driver 200 to the data lines, and lead lines that connect the display driver 200 to the pad portion. Each of the thin film transistors may include a semiconductor region, a source electrode, a drain electrode, and a gate electrode. For example, when the gate driver is formed on one side of the non-display area NDA of the display panel 100, the gate driver may include thin film transistors.

The thin film transistor layer 130 may be positioned in the display area DA, the non-display area NDA, and the sub-region SBA. Thin film transistors, gate lines, data lines, and power lines of each of the pixels of the thin film transistor layer 130 may be positioned in the display area DA. Gate control lines and fan-out lines of the thin film transistor layer 130 may be positioned in the non-display area NDA. The lead lines of the thin film transistor layer 130 may be positioned in the sub-region SBA.

The light emitting element layer 150 may be positioned on the thin film transistor layer 130. The light emitting element layer 150 may include a plurality of light emitting elements each including a pixel electrode, a light emitting layer, and a common electrode to emit light, and a pixel defining layer that defines the pixels. The plurality of light emitting elements of the light emitting element layer 150 may be positioned in the display area DA.

In one embodiment, the light emitting layer may be an organic light emitting layer including an organic material. The light emitting layer may include a hole transporting layer, an organic light emitting layer, and an electron transporting layer. When the first electrode receives a voltage through the thin film transistor of the thin film transistor layer 130 and the second electrode receives the cathode voltage, holes and electrons may be transferred to the organic light emitting layer through the hole transporting layer and the electron transporting layer, respectively and may be combined with each other to emit light in the organic light emitting layer.

In another embodiment, the light emitting elements may include a quantum dot light emitting diode including a quantum dot light emitting layer, an inorganic light emitting diode including an inorganic semiconductor, or a micro light emitting diode.

The thin film encapsulation layer 170 may cover the top surface and the side surface of the light emitting element layer 150, and may protect the light emitting element layer 150. The thin film encapsulation layer 170 may include at least one inorganic layer and at least one organic layer for encapsulating the light emitting element layer 150.

The touch sensor layer 180 may be positioned on the thin film encapsulation layer 170. The touch sensor layer 180 may include a plurality of touch electrodes for sensing a user's touch in a capacitive manner, and touch lines connecting the plurality of touch electrodes to the touch driver 400. For example, the touch sensor layer 180 may sense the user's touch by using a mutual capacitance method or a self-capacitance method.

In another embodiment, the touch sensor layer 180 may be positioned on a separate substrate disposed on the display layer DPL. In this case, the substrate supporting the touch sensor layer 180 may be a base member that encapsulates the display layer DPL.

The color filter layer 190 may be positioned on the touch sensor layer 180. The color filter layer 190 may include a plurality of color filters respectively disposed in areas corresponding to the plurality of emission areas. Each of the color filters may selectively transmit light of a specific wavelength and may block or absorb light of a different wavelength. The color filter layer 190 may absorb a part of light coming from the outside of the display device 10 to reduce reflected light due to external light. Accordingly, the color filter layer 190 may prevent color distortion caused by reflection of the external light.

Since the color filter layer 190 is directly disposed on the touch sensor layer 180, the display device 10 may not require a separate substrate for the color filter layer 190. Accordingly, the thickness of the display device 10 may decrease.

Figure 4:
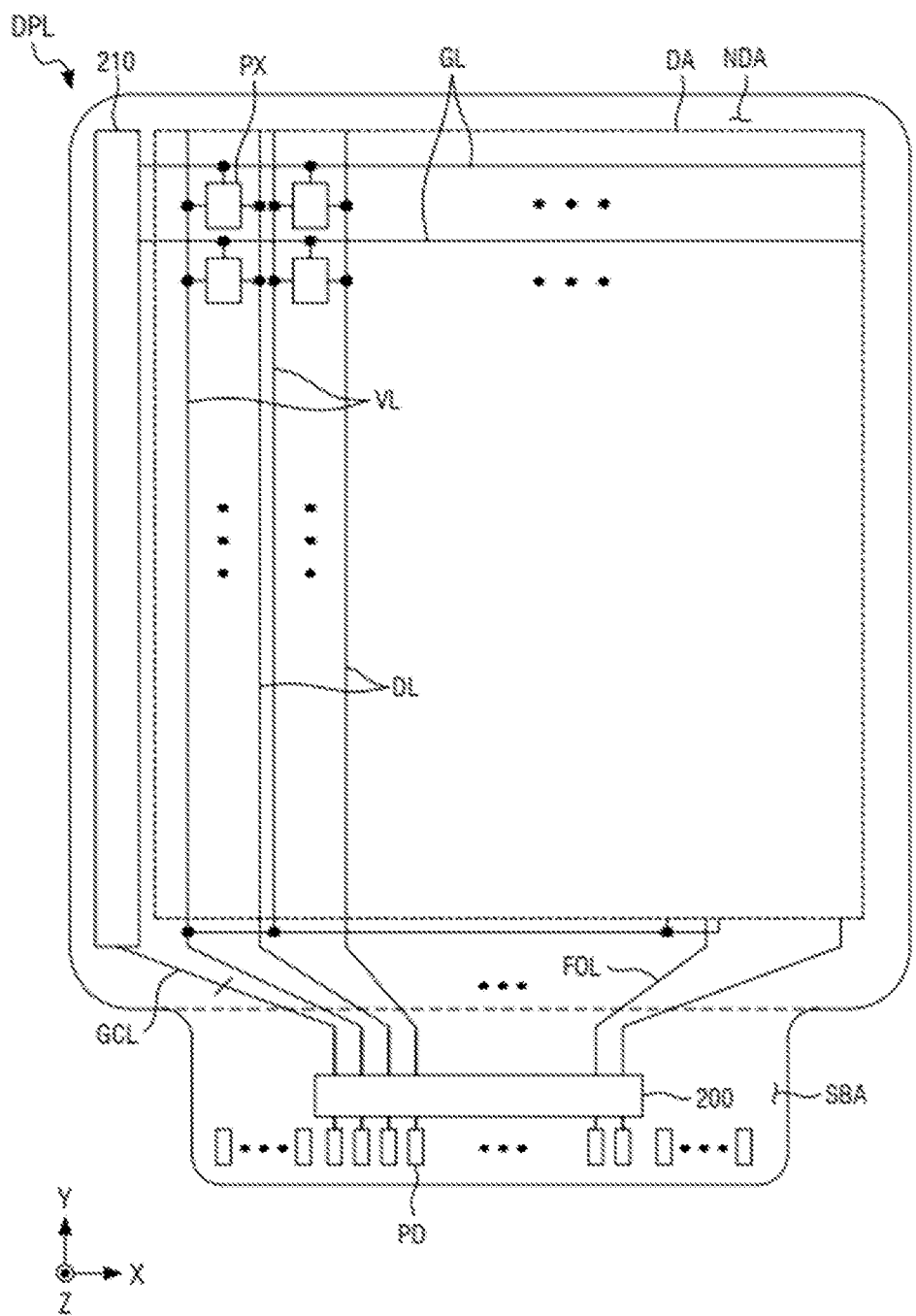
FIG. 4 is a plan view illustrating the display layer of the display device according to one embodiment.

FIG. 4 is a plan view illustrating the display layer DPL of the display device according to one embodiment.

Referring to FIG. 4, the display layer DPL may include the display area DA and the non-display area NDA.

The display area DA may be positioned at the center of the display panel 100. Some of a plurality of pixels PX, a plurality of gate lines GL, a plurality of data lines DL, and a plurality of power lines VL may be positioned in the display area DA. Each of the plurality of pixels PX may be defined as a minimum unit that emits light.

The plurality of gate lines GL may supply the gate signals received from the gate driver 210 to the plurality of pixels PX. The plurality of gate lines GL may extend in the first direction (X-axis direction) and may be spaced apart from each other in the second direction (Y-axis direction) intersecting the first direction (X-axis direction).

The plurality of data lines DL may supply the data voltages received from the display driver 200 to the plurality of pixels PX. The plurality of data lines DL may extend in the second direction (Y-axis direction) and may be spaced apart from each other in the first direction (X-axis direction).

The plurality of power lines VL may supply the power voltage received from the display driver 200 to the plurality of pixels PX. Here, the power voltage may be at least one of a driving voltage, an initialization voltage, or a reference voltage. The plurality of power lines VL may extend in the second direction (Y-axis direction) and may be spaced apart from each other in the first direction (X-axis direction).

The non-display area NDA may surround the display area DA. The plurality of power lines VL, the gate driver 210, fan-out lines FOL, and gate control lines GCL may be positioned in the non-display area NDA. The gate driver 210 may generate a plurality of gate signals based on the gate control signal, and may sequentially supply the plurality of gate signals to the plurality of gate lines GL according to a set order.

The fan-out lines FOL may extend from the display driver 200 to the display area DA. The fan-out lines FOL may supply the data voltage received from the display driver 200 to the plurality of data lines DL.

The gate control lines GCL may extend from the display driver 200 to the gate driver 210. The gate control lines GCL may supply the gate control signal received from the display driver 200 to the gate driver 210. In the drawing, it is illustrated that the gate driver 210 is disposed only in the non-display area NDA disposed on the left side of the display area DA, but is not limited thereto. In some embodiments, the display device 10 may include a plurality of gate drivers 210 respectively disposed on the left side and the right side of the display area DA.

The display driver 200 and a plurality of display pads PD are disposed in the sub-region SBA.

The display driver 200 may output signals and voltages for driving the display panel 100 to the fan-out lines FOL. The display driver 200 may supply a data voltage to the data line DL through the fan-out lines FOL. The data voltages may be supplied to the plurality of pixels PX, and the luminance of the plurality of pixels PX may be controlled by the data voltages. The display driver 200 may supply the gate control signal to the gate driver 210 through the gate control lines GCL.

The plurality of display pads PD may be connected to a graphic system through the circuit board 300. The plurality of display pads PD may be connected to the circuit board 300 to receive digital video data, and may supply the digital video data to the display driver 200.

Figure 5:
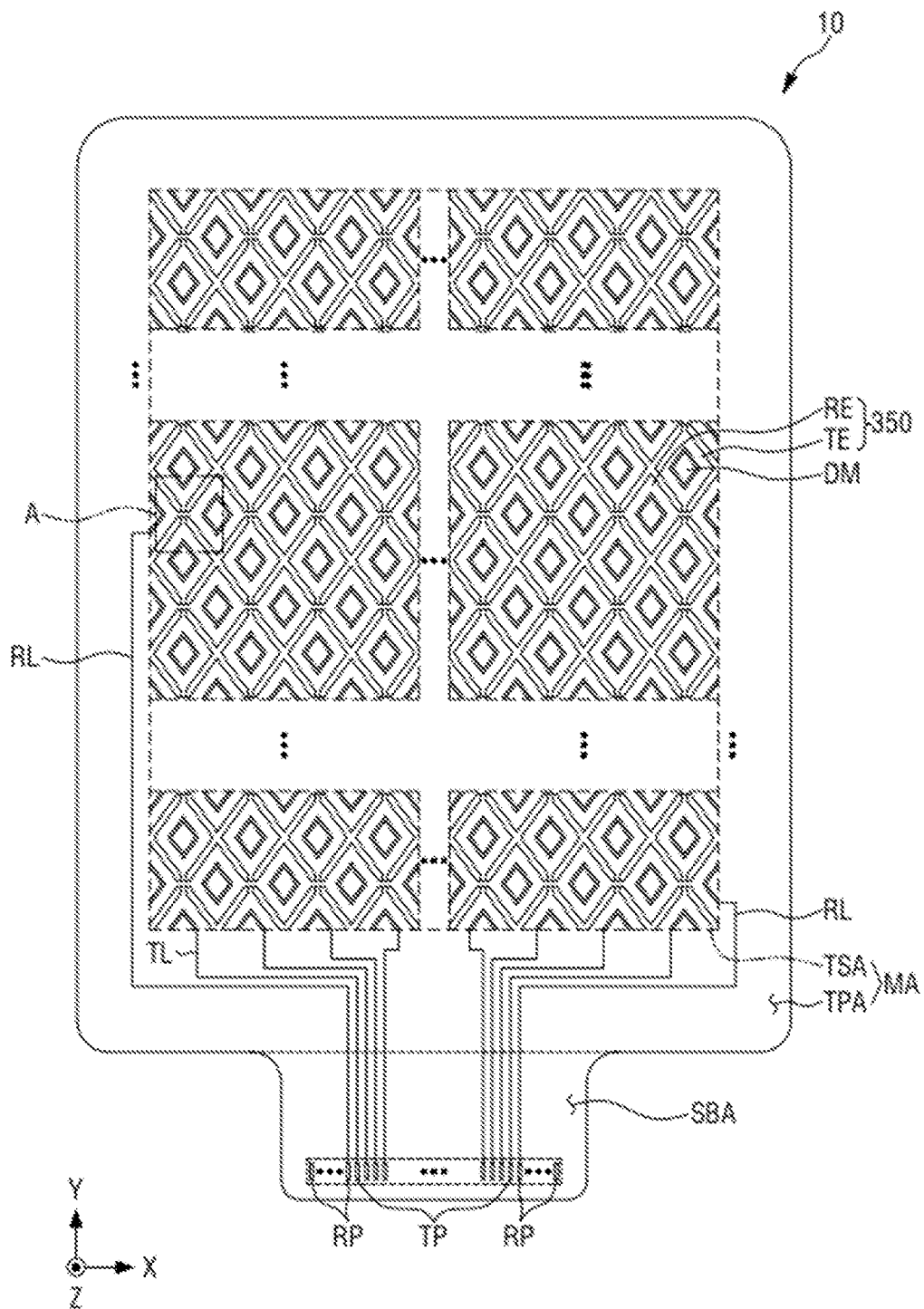
FIG. 5 is a plan view illustrating the touch sensor layer of the display device according to one embodiment.

FIG. 5 is a plan view illustrating the touch sensor layer 180 of the display device 10 according to one embodiment.

Referring to FIG. 5, the touch sensor layer 180 of the display device 10 may include a touch sensing area TSA for sensing a user's touch and a touch peripheral area TPA disposed around the touch sensing area TSA. The touch sensing area TSA may overlap the display area DA of FIGS. 1 to 4, and the touch peripheral area TPA may overlap the non-display area NDA of FIGS. 1 to 4.

In some embodiments, the touch sensor layer 180 may include a plurality of driving electrodes TE, a plurality of sensing electrodes RE, and a plurality of dummy electrodes DM positioned in the touch sensing area TSA, and a plurality of driving lines TL, a plurality of sensing lines RL, a plurality of driving pads TP, and a plurality of sensing pads RP positioned in the touch peripheral area TPA.

The plurality of driving electrodes TE may be positioned in the first direction (X-axis direction). For example, the plurality of driving electrodes TE may be positioned from the left side to the right side of the touch sensing area TSA. The plurality of adjacent driving electrodes TE may be electrically separated from each other, and the plurality of driving electrodes TE disposed separately may be connected to each other through a first connection electrode BE1 to be described later. The plurality of driving electrodes TE may be connected to the driving lines TL corresponding thereto at the lower side of the touch sensing area TSA facing the sub-region SBA. The plurality of driving lines TL may be positioned in the touch peripheral area TPA.

A plurality of sensing electrodes RE may be positioned in the second direction (Y-axis direction). For example, the plurality of sensing electrodes RE may be positioned from the lower side to the upper side of the touch sensing area TSA. The plurality of adjacent sensing electrodes RE may be electrically separated from each other, and the plurality of sensing electrodes RE disposed separately may be connected to each other through a second connection electrode BE2 to be described later. The plurality of sensing electrodes RE may be connected to the corresponding sensing line RL on the left side or right side of the touch sensing area TSA. The plurality of sensing lines RL may be positioned in the touch peripheral area TPA.

The plurality of dummy electrodes DM may be surrounded by the driving electrode TE or the sensing electrode RE. Each of the plurality of dummy electrodes DM may be electrically separated from the driving electrode TE or the sensing electrode RE. Each of the plurality of dummy electrodes DM may be positioned to be spaced apart from the driving electrode TE or the sensing electrode RE. Each of the plurality of dummy electrodes DM may be electrically floating.

The plurality of electrodes, i.e., the driving electrode TE, the sensing electrode RE, the first connection electrode BE1 and the second connection electrode BE2, included in the touch sensor layer 180 may be formed as a single layer or multiple layers made of any one of molybdenum (Mo), aluminum (Al), chromium (Cr), gold (Au), titanium (Ti), nickel (Ni), neodymium (Nd) and copper (Cu) or an alloy thereof.

Although each of the plurality of driving electrodes TE, each of the plurality of sensing electrodes RE, and each of the plurality of dummy electrodes DM are illustrated in FIG. 5 as having a rhombic planar shape, the present disclosure is not limited thereto. For example, each of the plurality of driving electrodes TE, each of the plurality of sensing electrodes RE, and each of the plurality of dummy electrodes DM may have a planar shape of a rectangle other than the rhombus, a polygon other than the rectangle, a circle, or an ellipse.

The plurality of driving pads TP may be positioned in the sub-region SBA and may be connected to the driving lines TL corresponding thereto. The plurality of sensing pads RP may be positioned in the sub-region SBA and connected to the corresponding sensing line RL. The plurality of driving pads TP and the plurality of sensing pads RP may be electrically connected to the circuit board 300 through a conductive adhesive member such as an anisotropic conductive film.

Figure 6:
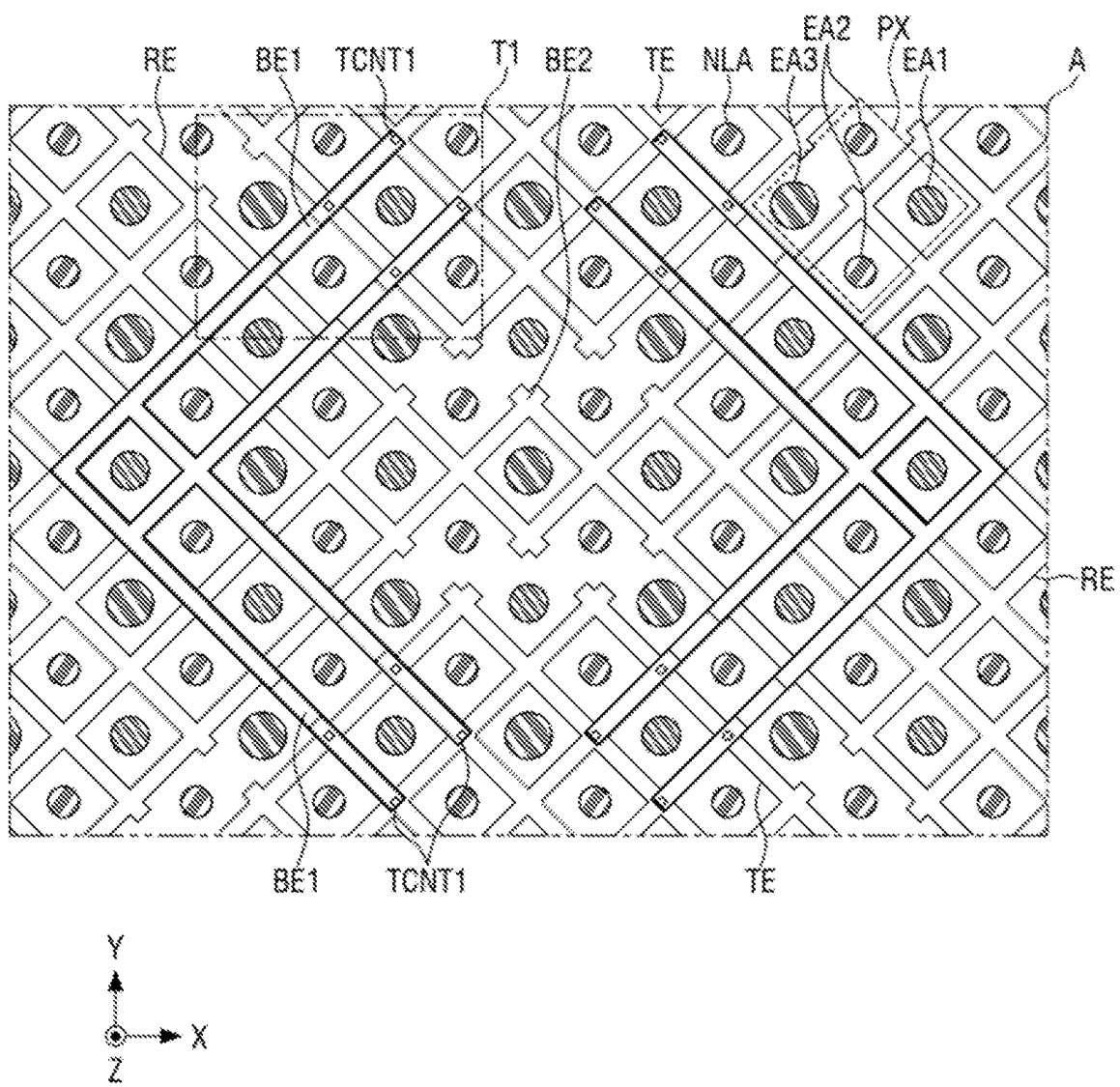
FIG. 6 is an enlarged plan view of area 'A' of FIG. 5.

FIG. 6 is an enlarged plan view of area 'A' of FIG. 5.

Referring to FIG. 6, the driving electrode TE, the sensing electrode RE, the first connection electrode BE1, and the second connection electrode BE2 included in the touch sensor layer 180 may be formed in a mesh shape. As described above, when the touch sensor layer 180 is formed directly on the thin film encapsulation layer 170, very large parasitic capacitance may be formed between a common electrode CE of the light emitting element layer 150 and the driving electrode TE or sensing electrode RE of the touch sensor layer 180 because the distance between the common electrode of the light emitting element layer 150 and the driving electrode TE or sensing electrode RE of the touch sensor layer 180 is short. Therefore, to reduce such parasitic capacitance, it may be desirable to form the driving electrodes TE and the sensing electrodes RE as the mesh-type electrodes. Therefore, since the plurality of electrodes included in the touch sensor layer 180 are formed in a mesh structure, they may not overlap a plurality of emission areas EA1, EA2, and EA3. As a result, light emitted from the plurality of emission areas EA1, EA2, and EA3 may not be blocked by the plurality of electrodes included in the touch sensor layer 180, thus light transmittance may be improved.

In some embodiments, the plurality of second connection electrodes BE2 may be positioned on the same layer as the plurality of driving electrodes TE and the plurality of sensing electrodes RE. Accordingly, the plurality of sensing electrodes RE adjacent in the first direction (X-axis direction) may be electrically connected to each other through the plurality of second connection electrodes BE2.

In some embodiments, the plurality of first connection electrodes BE1 may be positioned on a different layer from the plurality of driving electrodes TE and the plurality of sensing electrodes RE. Each of the plurality of first connection electrode BE1 may have a bent portion. FIG. 6 illustrates the plurality of first connection electrodes BE1 having a planar shape of an angle bracket ("<" or ">"), but the present disclosure is not limited thereto.

Each of the plurality of first connection electrodes BE1 may overlap the plurality of driving electrodes TE adjacent in the second direction (Y-axis direction) in the third direction (Z-direction). One side of the first connection electrode BE1 may be connected to any one of the driving electrodes TE disposed adjacent in the second direction (Y-axis direction) through touch contact holes TCNT1. The other side of the first connection electrode BE1 may be connected to another driving electrode TE among the driving electrodes TE disposed adjacent in the second direction (Y-axis direction) through the touch contact holes TCNT1. Therefore, due to the plurality of first connection electrodes BE1, the plurality of driving electrodes TE and the plurality of sensing electrodes RE may be electrically separated from each other at portions where they intersect. As a result, mutual capacitance may be formed at each of the intersections between the plurality of driving electrodes TE and the plurality of sensing electrodes RE.

As shown in FIG. 6, the emission areas EA1, EA2, and EA3 may be defined between the electrodes having a mesh shape. The emission areas EA1, EA2, and EA3 may include a first emission area EA1 that emits light of a first color, a second emission area EA2 that emits light of a second color, and a third emission area EA3 that emits light of a third color. Accordingly, the pixel PX may include one first emission area EA1, two second emission areas EA2, and one third emission area EA3. For example, the first color may be red, the second color may be green, and the third color may be blue. The pixel PX may emit white light. In each of the plurality of pixels PX, the first emission area EA1 and the third emission area EA3 may be disposed adjacent to each other in the first direction (X-axis direction), and the plurality of second emission areas EA2 may be disposed adjacent to each other in the second direction (Y-axis direction).

Each of the first emission area EA1, the second emission area EA2, and the third emission area EA3 may have a circular shape in a plan view, but is not limited thereto. Each of the first emission area EA1, the second emission area EA2, and the third emission area EA3 may have a polygonal shape other than a quadrilateral shape, or an elliptical shape in a plan view. Although FIG. 6 illustrates that the third emission area EA3 has the largest area and the second emission area EA2 has the smallest area, the present disclosure is not limited thereto.

The non-emission area NLA may surround each of the emission areas EA1, EA2, and EA3. A pixel defining layer 151 and a light blocking layer BM, which will be described later, may overlap in the non-emission area NLA.

Figure 7:
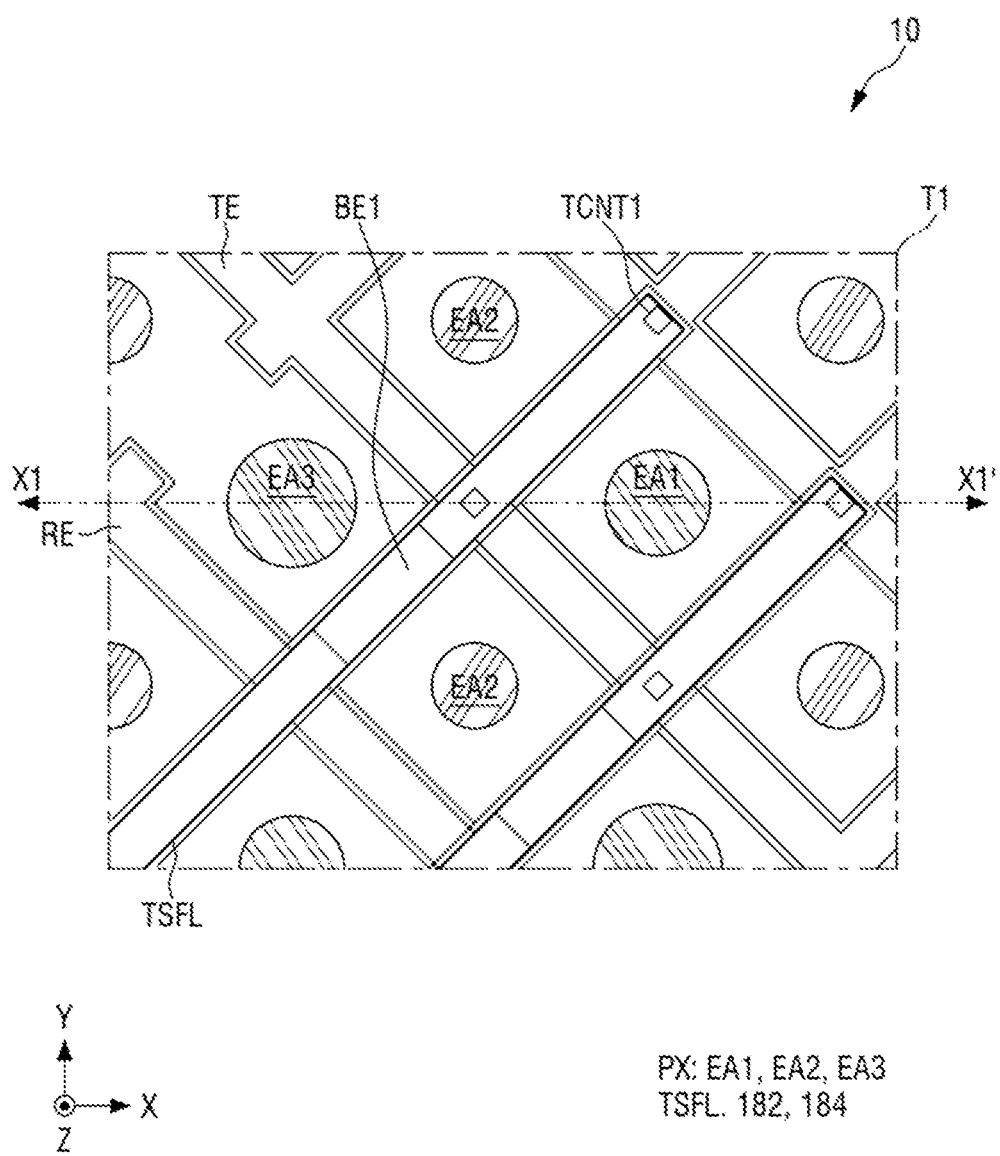
FIG. 7 is an enlarged plan view of portion 'T1' of FIG. 6.

FIG. 7 is an enlarged plan view of portion 'T1' of FIG. 6.

Referring to FIG. 7, the touch sensor layer 180 may include a touch sacrificial layer TSFL that is disposed under the touch electrodes RE and TE. The touch sacrificial layer TSFL may include a first touch sacrificial layer 182 that is overlapped with the first connection electrode BE1, and a second touch sacrificial layer 184 that is overlapped with the touch electrodes RE and TE and the second connection electrode BE2 in a plan view. The first connection electrode BE1 may be completely overlapped with the first touch sacrificial layer 182 in a plan view. The sensing electrode RE may be completely overlapped with a first portion 184A of the second touch sacrificial layer TSFL and the driving electrode TE may be completely overlapped with a second portion 184B of the second touch sacrificial layer except a region connected to the first contact electrode BE1 in a plan view.

In some embodiments, the touch sacrificial layer TSFL of the display device 10 may be formed in the same mesh shape as the touch electrodes RE and TE, and may expose the emission areas EA1, EA2, and EA3, but is not limited thereto. In another embodiment, the touch sacrificial layer TSFL may be formed on the entire surface while overlapping the emission areas EA1, EA2, and EA3 and the non-emission area NLA.

The touch sacrificial layer TSFL included in the touch sensor layer 180 may reduce the etching rate of the touch electrodes RE and TE and the first connection electrode BE1 during a manufacturing process. This will be described in detail later.

Figure 8:
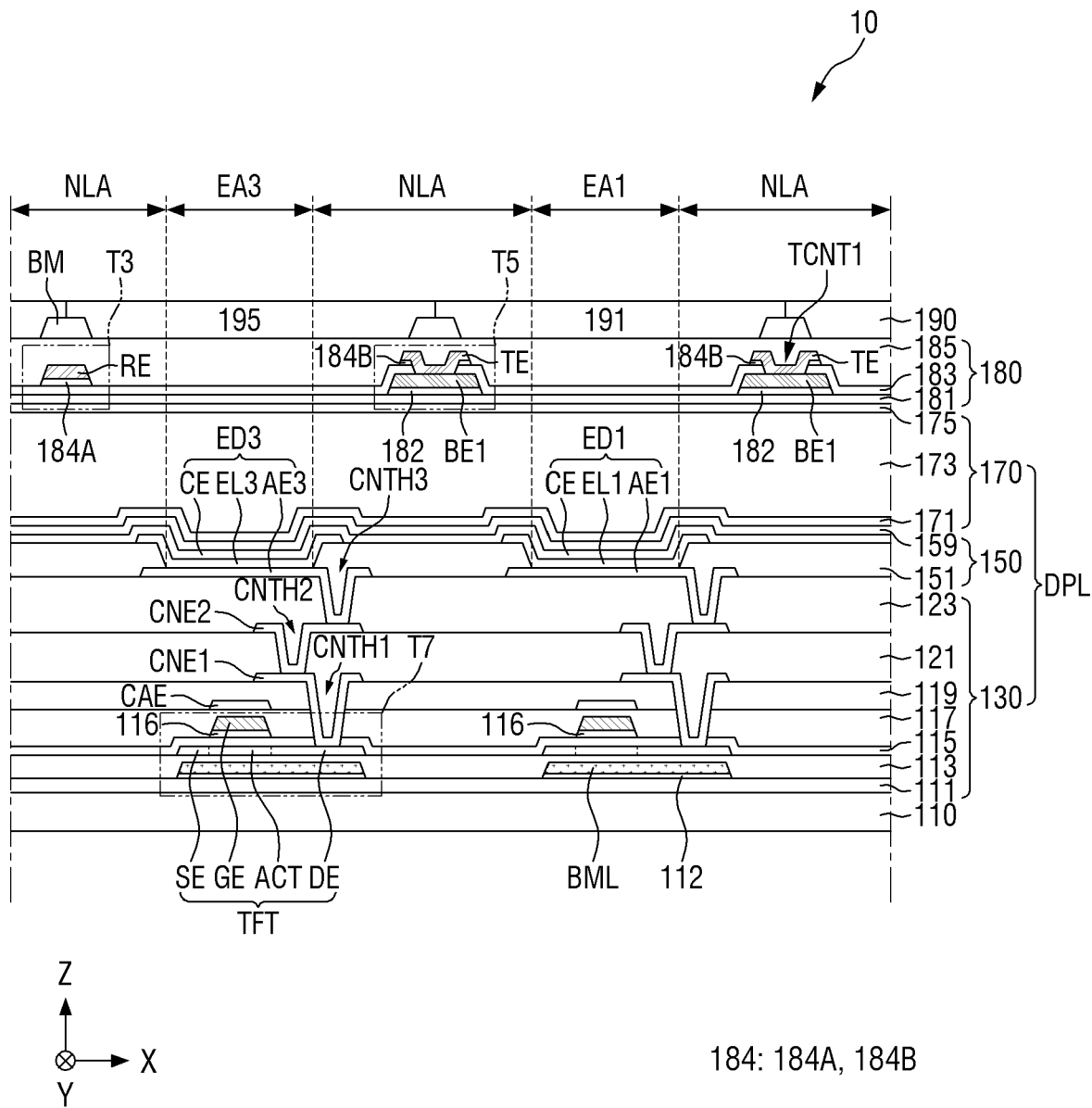
FIG. 8 is a cross-sectional view showing a schematic cross section taken along line X1-X1' of FIG. 7.

FIG. 8 is a cross-sectional view showing a schematic cross section taken along line X1-X1' of FIG. 7.

A cross-sectional structure of the display device 10 will be described with reference to FIG. 8.

Since the substrate 110 has already been described above, detailed description thereof will be omitted.

The thin film transistor layer 130 may include a first buffer layer 111, a first sacrificial layer 112, a lower metal layer BML, a second buffer layer 113, a thin film transistor TFT, a gate insulating layer 115, a second sacrificial layer 116, a first interlayer insulating layer 117, a second interlayer insulating layer 119, a first connection electrode CNE1, a first via layer 121, a second connection electrode CNE2, and a second via layer 123.

The first buffer layer 111 may be positioned on the substrate 110. The first buffer layer 111 may include an inorganic layer capable of preventing penetration of air or moisture. For example, the first buffer layer 111 may include a plurality of inorganic layers alternately stacked. For example, the first buffer layer 111 may be formed as multiple layers in which one or more inorganic layers of a silicon nitride layer, a silicon oxynitride layer, a silicon oxide layer, a titanium oxide layer and an aluminum oxide layer are alternately stacked.

The first sacrificial layer 112 may be positioned between the first buffer layer 111 and the lower metal layer BML. The first sacrificial layer 112 may be positioned to overlap the lower metal layer BML, and may be in contact with the lower metal layer BML. The first sacrificial layer 112 of the display device 10 may not be positioned anywhere other than an area overlapping the lower metal layer BML. That is, the first sacrificial layer 112 may have an island shape while overlapping the lower metal layer BML.

The first sacrificial layer 112 may include a material having an etching rate higher than that of the lower metal layer BML. In a wet etching process for forming the lower metal layer BML, the first sacrificial layer 112 may react with a hydrofluoric acid-based etchant to reduce a lateral etching of the lower metal layer BML.

The first sacrificial layer 112 may include an inorganic film having a low film density. For example, the first sacrificial layer 112 may include silicon nitride, silicon oxynitride, or silicon oxide. However, the present disclosure is not limited thereto, and the first sacrificial layer 112 may include any inorganic film that reacts with a hydrofluoric acid-based etching solution to reduce the etching rate of the lower metal layer BML. Specifically, the film density of the first sacrificial layer 112 measured by an X-ray reflectometry (XRR) analyzer may be 2.2 g/cm$^3$ or less.

The lower metal layer BML may be positioned on the first sacrificial layer 112. The lower metal layer BML in the present embodiment may be a structure containing copper (Cu), but is not limited thereto. Specifically, the lower metal layer BML may be formed as a single layer or multiple layers made of any one of molybdenum (Mo), aluminum (Al), chromium (Cr), gold (Au), titanium (Ti), nickel (Ni), neodymium (Nd) and copper (Cu) or an alloy thereof.

The second buffer layer 113 may cover the first buffer layer 111 and the lower metal layer BML. The second buffer layer 113 may include an inorganic layer capable of preventing penetration of air or moisture. For example, the second buffer layer 113 may include a plurality of inorganic layers alternately stacked. The second buffer layer 113 may include the same material as the first buffer layer 111.

The thin film transistor TFT may be positioned on the second buffer layer 113. The thin film transistor TFT may include an active layer ACT, a gate electrode GE, a source electrode SE, and a drain electrode DE. The active layer ACT of the thin film transistor TFT includes polycrystalline silicon, monocrystalline silicon, low-temperature polycrystalline silicon, amorphous silicon, or an oxide semiconductor. The active layer ACT overlapping the gate electrode GE in the third direction (Z-axis direction) that is the thickness direction of the substrate 110 may be defined as a channel region. The source electrode SE and the drain electrode DE that are not overlapped with the gate electrode GE in the third direction (Z-axis direction) may have conductivity by doping a silicon semiconductor or an oxide semiconductor with ions or impurities.

The gate insulating layer 115 may be positioned on the active layer ACT. The gate insulating layer 115 may cover the active layer ACT and the second buffer layer 113 and may insulate the active layer ACT from the gate electrode GE. The gate insulating layer 115 may be disposed to have a substantially constant thickness along the profile of the active layer ACT. The gate insulating layer 115 may include a first contact hole CNTH1 through which the first connection electrode CNE1 is connected to the drain electrode DE.

The gate insulating layer 115 may include an inorganic insulating material and may be formed as a plurality of layers. For example, the gate insulating layer 115 may be formed of an inorganic material such as a silicon nitride layer, a silicon oxynitride layer, a silicon oxide layer, a titanium oxide layer and an aluminum oxide layer.

The second sacrificial layer 116 may be positioned between the gate insulating layer 115 and the gate electrode GE. The second sacrificial layer 116 is positioned to be overlapped with the gate electrode GE, and the second sacrificial layer 116 may be in contact with the gate electrode GE. The second sacrificial layer 116 of the display device 10 may not be positioned anywhere other than an area overlapping the gate electrodes GE and/or gate lines connected to the gate electrodes GE. That is, the second sacrificial layer 116 may have island shape while overlapping the gate electrode GE.

The second sacrificial layer 116 may include a material having an etching rate higher than that of the gate electrode GE. In a wet etching process for forming the gate electrode GE, the second sacrificial layer 116 may react with a hydrofluoric acid-based etchant to reduce a lateral etching of the gate electrode GE.

The second sacrificial layer 116 may include an inorganic film having a low film density. For example, the second sacrificial layer 116 may include silicon nitride, silicon oxynitride, or silicon oxide. However, the present disclosure is not limited thereto, and the second sacrificial layer 116 may include any inorganic film that reacts with a hydrofluoric acid-based etching solution to reduce the lateral etching of the gate electrode GE. Specifically, the film density of the second sacrificial layer 116 measured by the X-ray reflectometry (XRR) analyzer may be 2.2 g/cm$^3$ or less.

The gate electrode GE may be disposed on the second sacrificial layer 116. The gate electrode GE may overlap the active layer ACT with the second sacrificial layer 116 and the gate insulating layer 115 interposed therebetween. The gate electrode GE may include metal. The gate electrode GE in the present embodiment may have a structure containing copper (Cu), but is not limited thereto. Specifically, the gate electrode GE may include at least one metal selected from the group consisting of molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W) and copper (Cu).

The first interlayer insulating layer 117 may be disposed on the gate electrode GE. The first interlayer insulating layer 117 may include an inorganic insulating material and may be formed as a plurality of layers. For example, the first interlayer insulating layer 117 may be formed of a silicon nitride layer, a silicon oxynitride layer, a silicon oxide layer, a titanium oxide layer, or an aluminum oxide layer. The first interlayer insulating layer 117 may include the first contact hole CNTH1 through which the first connection electrode CNE1 passes.

A capacitor electrode CAE may be disposed on the first interlayer insulating layer 117. The capacitor electrode CAE may overlap the gate electrode GE of the thin film transistor TFT in the third direction (Z-axis direction). Since the first interlayer insulating layer 117 has a predetermined permittivity, a capacitor may be formed by the first interlayer insulating layer 117 disposed between the capacitor electrode CAE and the gate electrode GE. The capacitor electrode CAE may include metal. For example, the capacitor electrode CAE may include at least one metal selected from the group consisting of molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W) and copper (Cu).

The second interlayer insulating layer 119 may be positioned on the first interlayer insulating layer 117 and the capacitor electrode CAE. The second interlayer insulating layer 119 may include an inorganic insulating material and may be formed as a plurality of layers. For example, the second interlayer insulating layer 119 may be formed of a silicon nitride layer, a silicon oxynitride layer, a silicon oxide layer, a titanium oxide layer, or an aluminum oxide layer. The second interlayer insulating layer 119 may include the first contact hole CNTH1 through which the first connection electrode CNE1 passes.

The first connection electrode CNE1 may be disposed on the second interlayer insulating layer 119. The first connection electrode CNE1 may electrically connect the drain electrode DE of the thin film transistor TFT to the second connection electrode CNE2. The first connection electrode CNE1 may be connected to the drain electrode DE of the thin film transistor TFT through the first contact hole CNTH1 formed in the first interlayer insulating layer 117, the second interlayer insulating layer 119, and the gate insulating layer 115.

The first via layer 121 may cover the first connection electrode CNE1 and the second interlayer insulating layer 119. The first via layer 121 may protect the thin film transistor TFT. The first via layer 121 may include an organic material. For example, the first via layer 121 may include an organic material such as acrylic resin, epoxy resin, phenol resin, polyamide resin, or polyimide resin. The first via layer 121 may include a second contact hole CNTH2 through which the second connection electrode CNE2 passes.

The second connection electrode CNE2 may be disposed on the first via layer 121. The second connection electrode CNE2 may electrically connect the first connection electrode CNE1 to pixel electrodes AE1, AE2, and AE3 of light emitting elements ED1, ED2, and ED3. The second connection electrode CNE2 may be in contact with the first connection electrode CNE1 through the second contact hole CNTH2 formed in the first via layer 121.

The second via layer 123 may be positioned on the second connection electrode CNE2 and the first via layer 121. The second via layer 123 may cover the second connection electrode CNE2 and the first via layer 121. The second via layer 123 may include an organic material. For example, the second via layer 123 may include an organic material such as acrylic resin, epoxy resin, phenol resin, polyamide resin, or polyimide resin. The second via layer 123 may include third contact holes CNTH3 through which the pixel electrodes AE1, AE2, and AE3 of the light emitting elements ED1, ED2, and ED3 pass.

The light emitting element layer 150 may be disposed on the thin film transistor layer 130. The light emitting element layer 150 may include the light emitting elements ED1, ED2, and ED3 and a pixel defining layer 151.

The light emitting elements ED1, ED2, and ED3 may include a first light emitting element ED1, a second light emitting element ED2, and a third light emitting element ED3 disposed in the emission areas EA1, EA2, and EA3, respectively. Specifically, the first light emitting element ED1 may disposed in the first emission area EA1, the second light emitting element ED2 may disposed in the second emission area EA2, and the third light emitting element ED3 may disposed in the third emission area EA3. In addition, the first light emitting element ED1 may include a first pixel electrode AE1, a first light emitting layer EL1, and a common electrode CE, the second light emitting element ED2 may include a second pixel electrode AE2, a second light emitting layer EL2, and the common electrode CE, and the third light emitting element ED3 may include a third pixel electrode AE3, a third light emitting layer EL3, and the common electrode CE. For simplicity of description, the first light emitting element ED1 and the third light emitting element ED3 are illustrated in the drawing and described, but the second light emitting element ED may also include the same structure and features as the first light emitting element ED1 and the third light emitting element ED3.

The pixel electrodes AE1, AE2, and AE3 may be disposed on the second via layer 123 in the emission areas EA1, EA2, and EA3. The pixel electrodes AE1, AE2, and AE3 may be disposed to cover openings defined by the pixel defining layer 151. The pixel electrodes AE1, AE2, and AE3 may be electrically connected to the drain electrode DE of the thin film transistor TFT through the first connection electrode CNE1 and the second connection electrode CNE2.

The pixel electrodes AE1, AE2, and AE3 may be metal having high electrical conductivity. For example, the pixel electrodes AE1, AE2, and AE3 may have a stacked structure formed by stacking a material layer having a high work function, such as indium tin oxide (ITO), indium zinc oxide (IZO), zinc oxide (ZnO) and indium oxide ($In_2O_3$), and a reflective material layer such as silver (Ag), magnesium (Mg), aluminum (Al), platinum (Pt), lead (Pb), palladium (Pd), gold (Au), nickel (Ni), neodymium (Nd), iridium (Ir), chromium (Cr), lithium (Li), calcium (Ca), or a mixture thereof. The layer having a high work function may be disposed above the reflective material layer and disposed closer to the light emitting layers EL1, EL2, and EL3. For example, the pixel electrodes AE1, AE2, and AE3 may have a multilayer structure of ITO/Mg, ITO/MgF, ITO/Ag, and ITO/Ag/ITO, but are not limited thereto.

The pixel defining layer 151 may serve to define the emission areas EA1, EA2, and EA3. The pixel defining layer 151 may expose parts of the pixel electrodes AE1, AE2, and AE3 on the second via layer 123 and cover the edges of the pixel electrodes AE1, AE2, and AE3. The pixel defining layer 151 may include an organic material. For example, the pixel defining layer 151 may include an organic material such as acrylic resin, epoxy resin, phenol resin, polyamide resin, or polyimide resin. The pixel defining layer 151 may be disposed in the third contact hole CNTH3. That is, the third contact hole CNTH3 may be filled with the pixel defining layer 151.

The light emitting layers EL1, EL2, and EL3 may be positioned on the pixel electrodes AE1, AE2, and AE3 in the emission areas EA1, EA2, and EA3, respectively. The light emitting layers EL1, EL2, and EL3 may include an organic material to emit light in a predetermined color. For example, the light emitting layers EL1, EL2, and EL3 may include a hole transporting layer, an organic material layer, and an electron transporting layer. The organic material layer may include a host and a dopant. The organic material layer may include a material that emits predetermined light, and may be formed using a phosphorescent material or a fluorescent material.

The common electrode CE may be positioned on the light emitting layers EL1, EL2, and EL3 and the pixel defining layer 151. The common electrode CE may be a common layer formed on the entire surface of the plurality of emission areas EA1, EA2, and EA3 and the pixel defining layer 151. The common electrode CE may include a transparent conductive material, so that the light generated in the light emitting layers EL1, EL2, and EL3 may be emitted. The common electrode CE may receive the common voltage or a low potential voltage. When the pixel electrodes AE1, AE2, and AE3 receive the voltage corresponding to a data voltage and the common electrode CE receives the low potential voltage, a potential difference is formed between the pixel electrodes AE1, AE2, and AE3 and the common electrode CE, so that the light emitting layers EL1, EL2, and EL3 may emit light.

The common electrode CE may be formed of a transparent conductive material (TCO) such as ITO or IZO that can transmit light or a semi-transmissive conductive material such as magnesium (Mg), silver (Ag), or an alloy of Mg and Ag. When the common electrode CE is formed of a semi-transmissive conductive material, the light emission efficiency can be increased due to a micro-cavity effect.

A capping layer 159 may be disposed on the common electrode CE. The capping layer 159 may prevent the light emitting elements ED1, ED2, and ED3 from being damaged by external air. The capping layer 159 may include an inorganic material. For example, the capping layer 159 may include aluminum oxide, titanium oxide, tantalum oxide, hafnium oxide, zinc oxide, silicon oxide, silicon nitride, or silicon oxynitride.

The thin film encapsulation layer 170 may be disposed on the light emitting element layer 150. The thin film encapsulation layer 170 may include at least one inorganic layer to prevent oxygen or moisture from permeating into the light emitting element layer 150. In addition, the thin film encapsulation layer 170 may include at least one organic layer to protect the light emitting element layer 150 from foreign substances such as dust. The thin film encapsulation layer 170 may include a first encapsulation layer 171, a second encapsulation layer 173, and a third encapsulation layer 175. The first encapsulation layer 171 may be disposed on the common electrode CE, the second encapsulation layer 173 may be disposed on the first encapsulation layer 171, and the third encapsulation layer 175 may be the second encapsulation layer 173.

The first encapsulation layer 171 and the third encapsulation layer 175 may be inorganic layers. For example, the first encapsulation layer 171 and the third encapsulation layer 175 may be formed as multiple layers in which one or more inorganic layers of a silicon nitride layer, a silicon oxynitride layer, a silicon oxide layer, a titanium oxide layer and an aluminum oxide layer are alternately stacked.

The second encapsulation layer 173 may be an organic layer. For example, the second encapsulation layer 173 may include an organic material such as acrylic resin, epoxy resin, phenol resin, polyamide resin, or polyimide resin.

The touch sensor layer 180 may be disposed on the thin film encapsulation layer 170. The touch sensor layer 180 may include a touch buffer layer 181, a first touch sacrificial layer 182, the first connection electrode BE1, a touch insulating layer 183, a second touch sacrificial layer 184, the touch electrodes TE and RE, the second connection electrode BE2, the dummy electrode DM, and a touch protection layer 185.

The touch buffer layer 181 may be disposed on the thin film encapsulation layer 170. The touch buffer layer 181 may include at least one inorganic layer. For example, the touch buffer layer 181 may be formed as multiple layers in which one or more inorganic layers of a silicon nitride layer, a silicon oxynitride layer, a silicon oxide layer, a titanium oxide layer and an aluminum oxide layer are alternately stacked. The touch buffer layer 181 may be omitted.

The first touch sacrificial layer 182 may be positioned between the touch buffer layer 181 and the first connection electrode BE1. The first touch sacrificial layer 182 may be positioned to overlap the first connection electrode BE1, and the first touch sacrificial layer 182 may be in contact with the first connection electrode BE1. The first touch sacrificial layer 182 of the display device 10 may not be positioned anywhere other than an area overlapping the first connection electrode BE1. That is, the first touch sacrificial layer 182 may have an island shape while overlapping the first connection electrode BE1.

The first touch sacrificial layer 182 may include a material having an etching rate higher than that of the first connection electrode BE1. In a wet etching process for forming the first connection electrode BE1, the first touch sacrificial layer 182 may react with a hydrofluoric acid-based etchant to reduce the etching rate of the first connection electrode BE1.

The first touch sacrificial layer 182 may include an inorganic film having a low film density. For example, the first touch sacrificial layer 182 may include silicon nitride, silicon oxynitride, or silicon oxide. However, the present disclosure is not limited thereto, and the first touch sacrificial layer 182 may include any inorganic film that reacts with a hydrofluoric acid-based etching solution to reduce the etching rate of the first connection electrode BE1. Specifically, the film density of the first touch sacrificial layer 182 measured by the X-ray reflectometry (XRR) analyzer may be 2.2 g/cm$^3$ or less.

The first connection electrode BE1 may be positioned on the first touch sacrificial layer 182. As described above, the first connection electrode BE1 may serve to electrically connect adjacent driving electrodes TE to each other. The first connection electrode BE1 included in the present embodiment is exemplified as having a structure containing copper (Cu), but is not limited thereto. Specifically, the first connection electrode BE1 may be formed as a single layer containing molybdenum (Mo), titanium (Ti), copper (Cu), or aluminum (Al), or may be formed to have a stacked structure (Ti/Al/Ti) of aluminum and titanium, a stacked structure (ITO/Al/ITO) of aluminum and indium tin oxide (ITO), an Ag—Pd—Cu (APC) alloy, or a stacked structure (ITO/APC/ITO) of APC alloy and ITO.

The touch insulating layer 183 may be disposed on the touch buffer layer 181 and the first connection electrodes BE1. The touch insulating layer 183 may insulate a part of the driving electrode TE from the first connection electrode BE1. The touch insulating layer 183 may be formed of an inorganic layer, for example, a silicon nitride layer, a silicon oxynitride layer, a silicon oxide layer, a titanium oxide layer, or an aluminum oxide layer.

The second touch sacrificial layer 184 may be positioned on the touch insulating layer 183. The second touch sacrificial layer 184 may be positioned between the touch insulating layer 183, and the driving electrode TE and the sensing electrode RE. The second touch sacrificial layer 184 may be positioned to overlap the driving electrode TE and the sensing electrode RE, and may be in contact with the driving electrode TE and the sensing electrode RE. The second touch sacrificial layer 184 of the display device 10 may not be positioned anywhere other than an area overlapping the driving electrode TE, the sensing electrode RE and the second connection electrode BE2. That is, the second touch sacrificial layer 184 may have an island shape while overlapping the driving electrode TE and the sensing electrode RE.

In some embodiments, the second touch sacrificial layer 184 may include a first portion 184A overlapped with the sensing electrode RE, and a second portion 184B overlapped with the driving electrode TE. This will be described in detail later.

The second touch sacrificial layer 184 may include a material having an etching rate higher than those of the driving electrode TE, the sensing electrode RE and the second connection electrode BE2. In a wet etching process for forming the driving electrode TE and the sensing electrode RE, the second touch sacrificial layer 184 may react with a hydrofluoric acid-based etchant to reduce the etching rates of the driving electrode TE and the sensing electrode RE. The second touch sacrificial layer 184 may include an inorganic film having a low film density. For example, the second touch sacrificial layer 184 may include silicon nitride, silicon oxynitride, or silicon oxide. However, the present disclosure is not limited thereto, and the second touch sacrificial layer 184 may include any inorganic film that reacts with a hydrofluoric acid-based etching solution to reduce the etching rates of the driving electrode TE and the sensing electrode RE. Specifically, the film density of the second touch sacrificial layer 184 measured by the X-ray reflectometry (XRR) analyzer may be 2.2 g/cm$^3$ or less.

The driving electrode TE, the sensing electrode RE and the second connection electrode BE2 may be positioned on the second touch sacrificial layer 184. The driving electrode TE, the sensing electrode RE and the second connection electrode BE2 may be positioned to overlap the non-emission area NLA.

The driving electrode TE, the sensing electrode RE and the second connection electrode BE2 included in the present embodiment are exemplified as having a structure containing copper (Cu), but are not limited thereto. Specifically, the driving electrode TE, the sensing electrode RE and the second connection electrode BE2 may be formed as a single layer containing molybdenum (Mo), titanium (Ti), copper (Cu), or aluminum (Al), or may be formed to have a stacked structure (Ti/Al/Ti) of aluminum and titanium, a stacked structure (ITO/Al/ITO) of aluminum and indium tin oxide (ITO), an Ag—Pd—Cu (APC) alloy, or a stacked structure (ITO/APC/ITO) of APC alloy and ITO. The driving electrodes TE may be electrically connected to the first connection electrode BE1 through the touch contact hole TCNT1.

The touch protection layer 185 may be disposed on the touch insulating layer 183, the driving electrode TE, the sensing electrode RE and the second connection electrode BE2. The touch protection layer 185 may serve to flatten the profile of its lower structure. The touch protection layer 185 may include at least one of an inorganic layer or an organic layer. The inorganic layer may be a silicon nitride layer, a silicon oxynitride layer, a silicon oxide layer, a titanium oxide layer, or an aluminum oxide layer. The organic layer may include an organic material such as acrylic resin, epoxy resin, phenol resin, polyamide resin, or polyimide resin.

The light blocking layer BM may overlap the non-emission area NLA and may be disposed on the touch sensor layer 180. The light blocking layer BM may be disposed to overlap the pixel defining layer 151 and the touch electrodes RE and TE. The light blocking layer BM may prevent visible light infiltration and color mixture between the first to third emission areas EA1, EA2, and EA3 to improve color reproducibility of the display device 10.

The light blocking layer BM may include a light absorbing material. For example, the light blocking layer BM may include an inorganic black pigment or an organic black pigment. The inorganic black pigment may be carbon black, and the organic black pigment may include at least one of lactam black, perylene black, or aniline black, but they are not limited thereto.

The color filter layer 190 may be disposed in the emission areas EA1, EA2, and EA3 and the non-emission area NLA and may be disposed on the touch protection layer 185 and the light blocking layer BM.

The color filter layer 190 may include a first color filter 191, a second color filter 193, and a third color filter 195 disposed to correspond to different emission areas EA1, EA2, and EA3, respectively. The plurality of color filters 191, 193, and 195 may include a colorant such as a dye or a pigment that absorbs light in a wavelength band other than light in a specific wavelength band, and may be disposed to correspond to the color of the light emitted from the emission areas EA1, EA2, and EA3. For example, the first color filter 191 may be a red color filter that is disposed to overlap the first emission area EA1 and transmits only the first light of the red color. The second color filter 193 may be a green color filter that is disposed to overlap the second emission area EA2 and transmits only the second light of the green color, and the third color filter 195 may be a blue color filter that is disposed to overlap the third emission area EA3 and transmits only the third light of the blue color.

Figure 9:
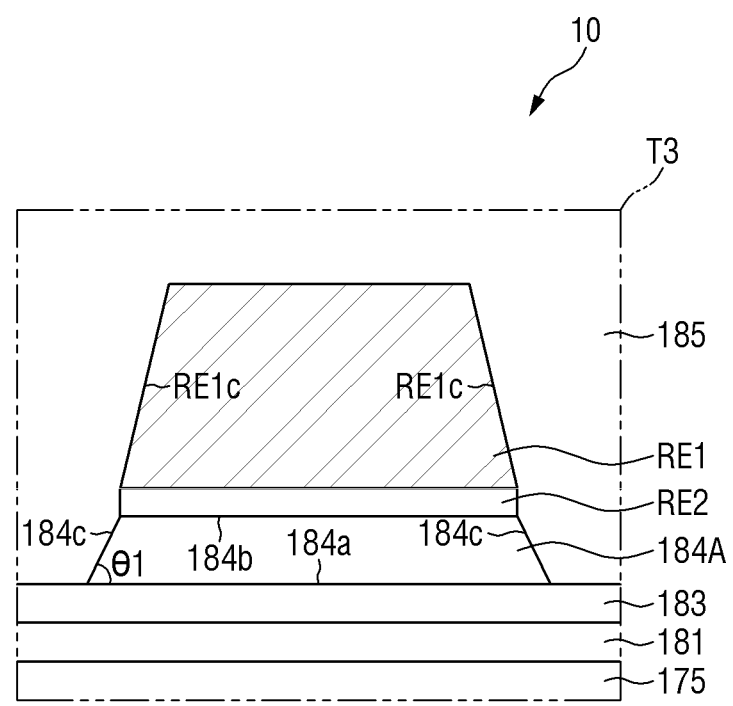
FIG. 9 is an enlarged cross-sectional view of portion 'T3' of FIG. 8.
Figure 10:
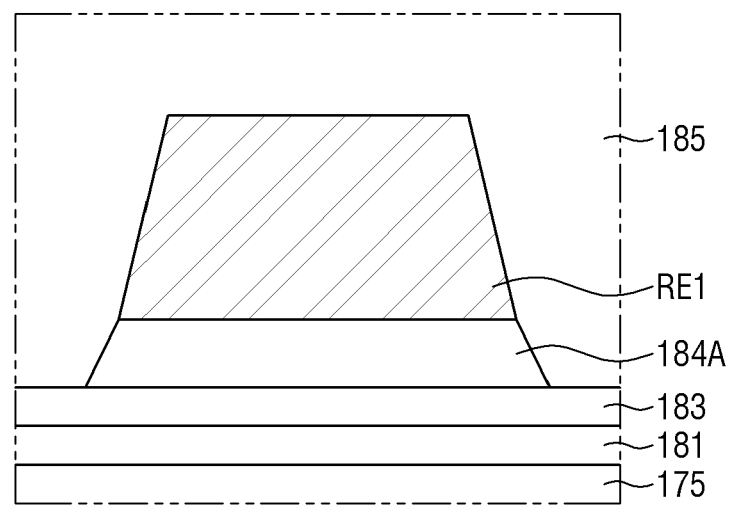
FIGS. 10 and 11 are enlarged cross-sectional views of the sensing electrode of the display device according to other embodiments of FIG. 9.
Figure 10:
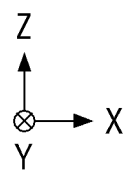
Figure 11:
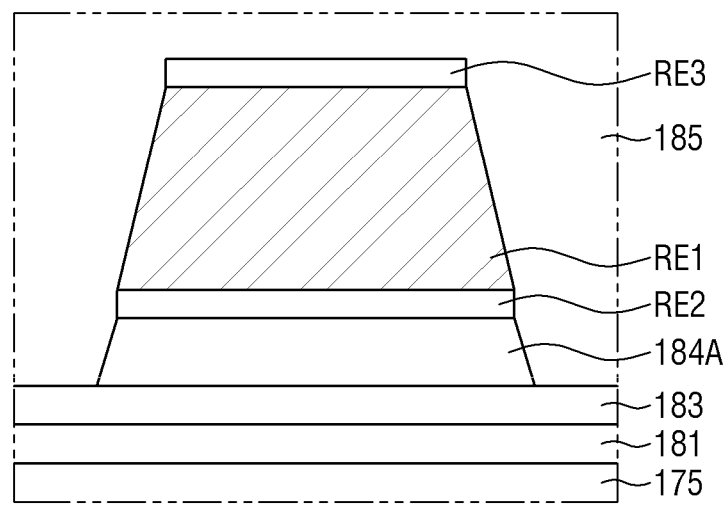
Figure 11:
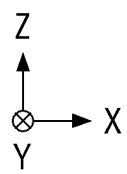

FIG. 9 is an enlarged cross-sectional view of portion 'T3' of FIG. 8. FIGS. 10 and 11 are enlarged cross-sectional views of the sensing electrode RE of the display device 10 according to other embodiments of FIG. 9.

In some embodiments, the second touch sacrificial layer 184 of the display device 10 may include the first portion 184A overlapped with the sensing electrode RE, and the second portion 184B overlapped with the driving electrode TE.

Referring to FIG. 9, the first portion 184A of the second touch sacrificial layer 184 overlapping the sensing electrode RE may include a bottom surface 184*a* facing the touch insulating layer 183, a top surface 184*b* facing the sensing electrode RE, and side surfaces 184*c* connecting the top surface 184*b* to the bottom surface 184*a*. The side surfaces 184*c* of the first portion 184A may be in contact with the touch protection layer 185. The side surface 184*c* of the first portion 184A may have an inclined surface by the aforementioned wet etching process. Accordingly, an inclination angle θ1 formed between the bottom surface 184*a* and the side surface 184*c* of the second touch sacrificial layer 184 may be an acute angle.

In some embodiments, the first portion 184A of the second touch sacrificial layer 184 may be formed on the entire surface of the touch insulating layer 183, and then formed in the island shape shown in the drawing by the aforementioned wet etching process. Accordingly, the first portion 184A of the second touch sacrificial layer 184 included in the display device 10 may be positioned in portions that overlap the sensing electrode RE.

In some embodiments, the sensing electrode RE may be formed in a double layer structure including a first layer RE1 and a second layer RE2. The second layer RE2 of the sensing electrode RE may be in contact with the second touch sacrificial layer 184. The second layer RE2 of the sensing electrode RE may include metal having an etching rate lower than that of the second touch sacrificial layer 184. For example, the second layer RE2 of the sensing electrode RE may include titanium (Ti) or molybdenum (Mo).

In addition, the first layer RE1 of the sensing electrode RE may be positioned in contact with the second layer RE2. The first layer RE1 of the sensing electrode RE may include metal having an etching rate lower than that of the second touch sacrificial layer 184. For example, the first layer RE1 of the sensing electrode RE may include copper (Cu). The thickness of the first layer RE1 of the sensing electrode RE in the third direction (Z-axis direction) may be greater than the thickness of the second layer RE2 of the sensing electrode RE.

In some embodiments, the first layer RE1 of the sensing electrode RE may include side surfaces RE1*c* facing the touch protection layer 185. The side surfaces RE1*c* of the first layer RE1 of the sensing electrode RE may be in contact with the touch protection layer 185.

As described above, the second touch sacrificial layer 184 may have an etching rate higher than those of the first and second layers RE1 and RE2 of the sensing electrode RE. Therefore, in the wet etching process during the manufacturing process of the display device 10, the second touch sacrificial layer 184 may be exposed to an etchant simultaneously with the first and second layers RE1 and RE2 of the sensing electrode RE, thereby reduces the etching rates of the first and second layers RE1 and RE2 of the sensing electrode RE. In other words, in the wet etching process during the manufacturing process, the second touch sacrificial layer 184 may react more with the hydrofluoric acid-based etching solution than the sensing electrode RE, thereby reduces the etching rate of the side surface RE1c of the sensing electrode RE. Accordingly, the sensing electrode RE of the display device 10 may have a low etching rate on the side surface RE1c.

In general, metal wiring included in high-resolution products may require a large thickness and a small wiring width. For example, when the lateral etching rate of metal wiring decreases, it is possible to form the metal wiring that may have a greater height and a narrow width. Therefore, the display device 10 according to the present embodiment may include a sacrificial layer containing an inorganic material under the metal wiring containing copper (Cu), thereby reducing the lateral etching rate of the metal wiring to form metal wiring applicable to high-resolution products.

In some embodiments, the sensing electrode RE is not limited to a double layer structure. In other embodiments, referring to FIG. 10, the sensing electrode RE may be formed of a single layer including only a first layer RE1, and referring to FIG. 11, the sensing electrode RE may be formed in a multilayer structure including a first layer RE1, a second layer RE2, and a third layer RE3.

As shown in FIG. 10, when the sensing electrode RE is formed of a single layer, the first layer RE1 of the sensing electrode RE may be positioned in contact with the first portion 184A of the second touch sacrificial layer 184. As described above, the first layer RE1 of the sensing electrode RE may include metal having an etching rate lower than that of the second touch sacrificial layer 184, and in one example, the first layer RE1 of the sensing electrode RE may include copper (Cu).

As shown in FIG. 11, when the sensing electrode RE is formed in a multilayer structure, the second layer RE2 of the sensing electrode RE may be positioned in contact with the second touch sacrificial layer 184, the first layer RE1 of the sensing electrode RE may be positioned on the second layer RE2, and the third layer RE3 of the sensing electrode RE may be positioned on the first layer RE1. The third layer RE3 of the sensing electrode RE may include metal having an etching rate lower than that of the second touch sacrificial layer 184. For example, the third layer RE3 of the sensing electrode RE may include titanium (Ti), molybdenum (Mo), and indium titanium oxide (ITO). For example, the sensing electrode RE formed in the multilayer structure may include wiring containing upper and lower metals such as Ti/Cu/Ti, Mo/Cu/Mo, or Ti/Cu/ITO.

As described above, regardless of the number of layers constituting the sensing electrode RE, the sensing electrode RE may include copper (Cu). In addition, regardless of the number of layers constituting the sensing electrode RE, the first portion 184A of the second touch sacrificial layer 184 may have an etching rate higher than that of the sensing electrode RE. Accordingly, the first portion 184A of the second touch sacrificial layer 184 may reduce the lateral etching rate of the sensing electrode RE.

Figure 12:
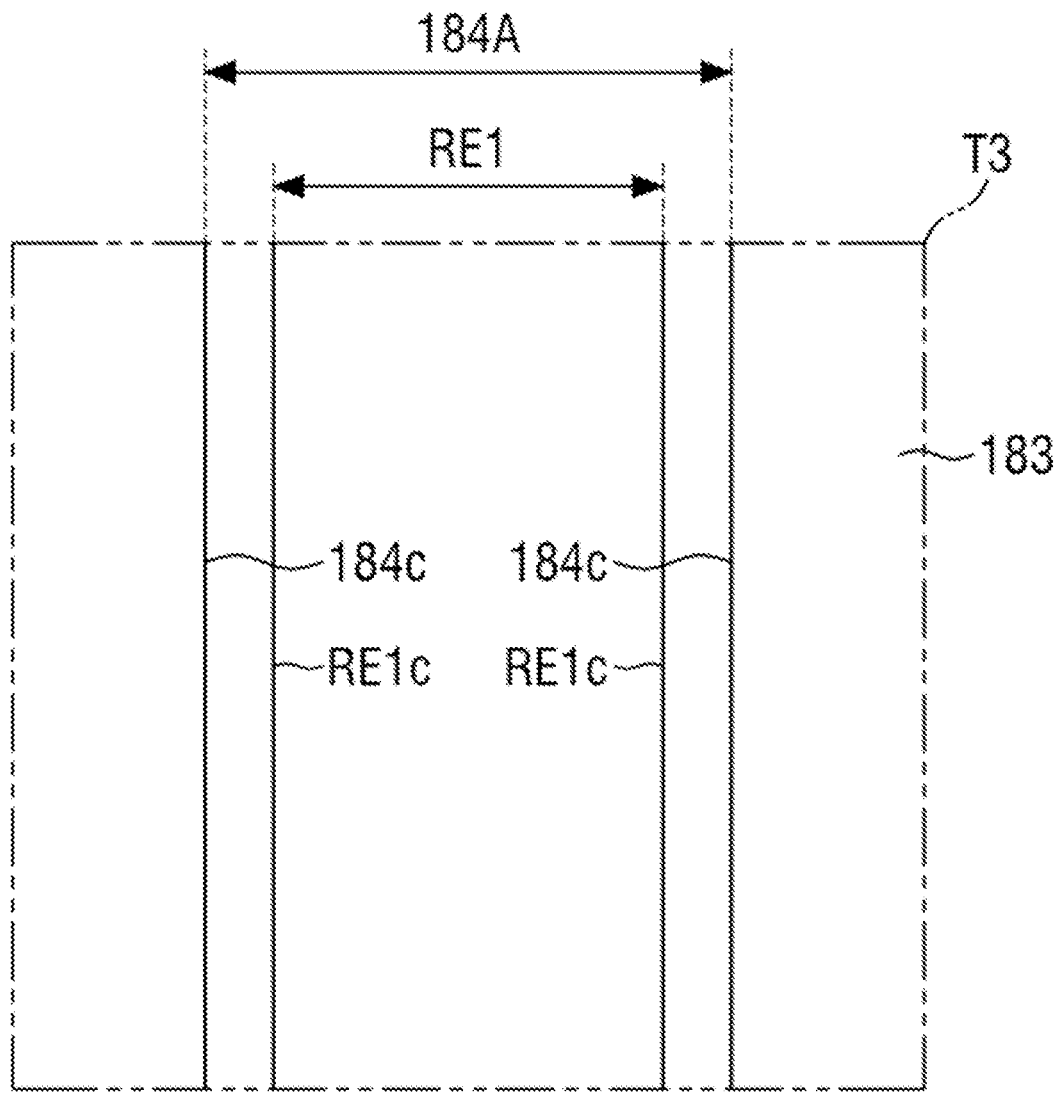
FIG. 12 is an enlarged plan view of portion 'T3' of FIG. 8.

FIG. 12 is an enlarged plan view of portion 'T3' of FIG. 8.

Referring to FIG. 12, in a plan view, the side surface RE1c of the sensing electrode RE included in the display device 10 may be completely overlapped with the first portion 184A of the second touch sacrificial layer 184. In addition, the side surface 184c of the first portion 184A of the second touch sacrificial layer 184 may be completely overlapped with the touch insulating layer 183 in a plan view. For simplicity of description, the sensing electrode RE is illustrated and described as an example, but metal wiring included in the display device 10 may all have the same structure.

Figure 13:
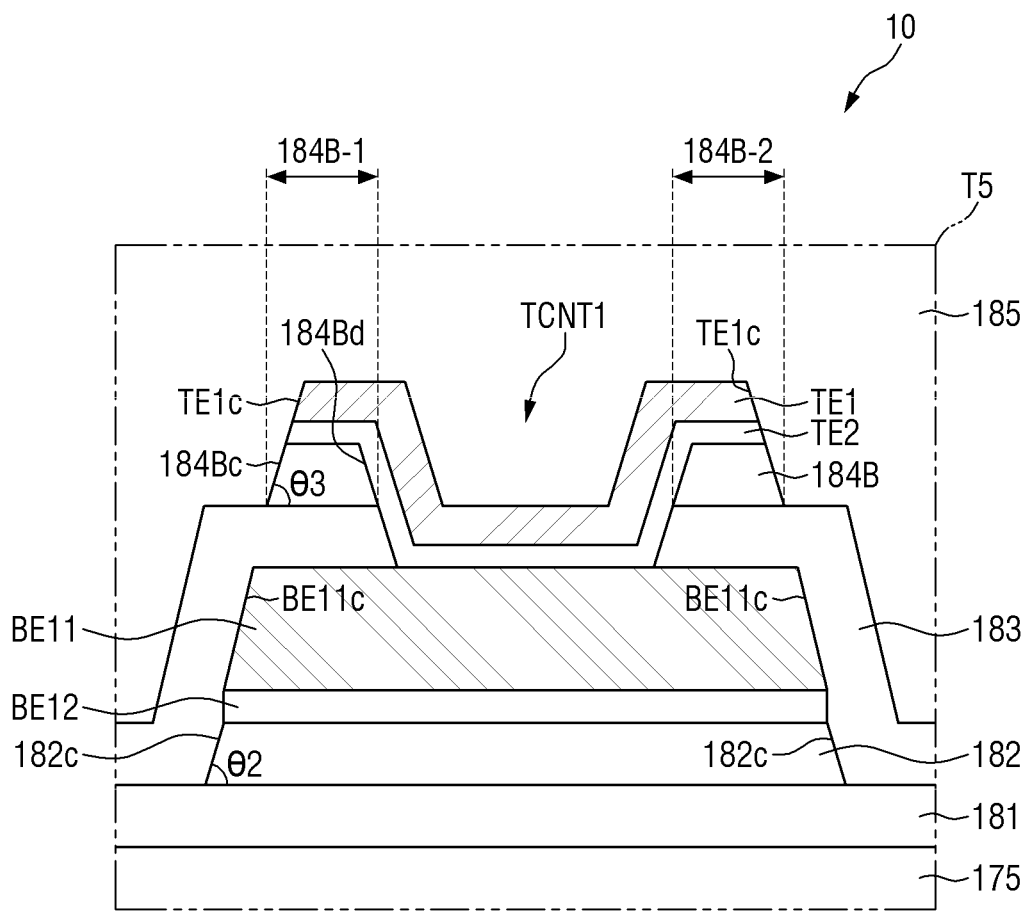
FIG. 13 is an enlarged cross-sectional view of portion 'T5' of FIG. 8.

FIG. 13 is an enlarged cross-sectional view of portion 'T5' of FIG. 8.

Referring to FIG. 13, the first touch sacrificial layer 182 may be positioned between the touch buffer layer 181 and the first connection electrode BE1. The first touch sacrificial layer 182 may be in contact with the touch buffer layer 181 and the first connection electrode BE1. The first touch sacrificial layer 182 may be positioned in an area overlapping the first connection electrode BE1. That is, the first touch sacrificial layer 182 may have an island shape while overlapped with the first connection electrode BE1.

The first touch sacrificial layer 182 may include side surfaces 182c in the first direction (X-axis direction). The side surfaces 182c of the first touch sacrificial layer 182 may have inclined surfaces by the aforementioned wet etching process. For example, an inclination angle θ2 formed between the side surface 182c of the first touch sacrificial layer 182 and the touch buffer layer 181 may be an acute angle. The side surfaces 182c of the first touch sacrificial layer 182 may be in contact with the touch insulating layer 183.

The first connection electrode BE1 may include a double layer structure including a first layer BE11 and a second layer BE12. The second layer BE12 of the first connection electrode BE1 may be in contact with the first touch sacrificial layer 182. The second layer BE12 of the first connection electrode BE1 may include metal having an etching rate lower than that of the first touch sacrificial layer 182. For example, the second layer BE12 of the first connection electrode BE1 may include titanium (Ti) or molybdenum (Mo).

In addition, the first layer BE11 of the first connection electrode BE1 may be positioned in contact with the second layer BE12. The first layer BE11 of the first connection electrode BE1 may include metal having an etching rate lower than that of the first touch sacrificial layer 182. For example, the first layer BE11 of the first connection electrode BE1 may include copper (Cu). The thickness of the first layer BE11 of the first connection electrode BE1 in the third direction (Z-axis direction) may be greater than the thickness of the second layer BE12 of the first connection electrode BE1.

In some embodiments, the first layer BE11 of the first connection electrode BE1 may include side surfaces BE11c. The side surfaces BE11c of the first connection electrode BE1 may be in contact with the touch insulating layer 183.

In some embodiments, the first connection electrode BE1 is not limited to a double layer structure. Specifically, the first connection electrode BE1 may have a single layer structure, similarly to that illustrated in FIG. 10, or may have a multilayer structure, similarly to that illustrated in FIG. 11. The first connection electrode BE1 may include the same structure and material as the sensing electrode RE. Other redundant descriptions will be omitted.

The first touch sacrificial layer 182 may have an etching rate higher than those of the first and second layers BE11 and BE12 of the first connection electrode BE1, thereby reduce the lateral etching rates of the first and second layers BE11 and BE12 of the first connection electrode BE1 in the wet etching process during the manufacturing process of the display device 10. Other redundant descriptions will be omitted.

The touch insulating layer 183 may be positioned on the first layer BE11 of the first connection electrode BE1. The first touch sacrificial layer 182 and the first connection electrode BE1 may be covered by the touch insulating layer 183.

As shown in FIG. 13, the touch contact hole TCNT1 is formed through the touch insulating layer 183. The driving electrode TE may be positioned on the first connection electrode BE1 and connected to the first connection electrode BE1 through the touch contact hole TCNT1 form through the touch insulating layer 183. As described above, the driving electrode TE may be connected to the first connection electrode BE1 through the touch contact hole TCNT1, and the driving electrode TE may be connected to another adjacent driving electrode TE through the first connection electrode BE1.

In some embodiments, the driving electrode TE of the display device 10 may be formed in a double layer structure including a first layer TE1 and a second layer TE2. The second layer TE2 of the driving electrode TE may be positioned on the touch insulating layer 183 and the first connection electrode BE1. Accordingly, the second layer TE2 of the driving electrode TE may include a stepped portion along the profile of its lower structure. The second layer TE2 of the driving electrode TE may be in contact with the second touch sacrificial layer 184 along an edge of the touch contact hole. The second layer TE2 of the driving electrode TE may include metal having an etching rate lower than that of the second touch sacrificial layer 184. For example, the second layer TE2 of the driving electrode TE may include titanium (Ti) or molybdenum (Mo).

In addition, the first layer TE1 of the driving electrode TE may be positioned in contact with the second layer TE2. The first layer TE1 of the driving electrode TE may include a stepped portion along the profile of the second layer TE2 of the driving electrode TE. The first layer TE1 of the driving electrode TE may include metal having an etching rate lower than that of the second touch sacrificial layer 184. For example, the first layer TE1 of the driving electrode TE may include copper (Cu). The thickness of the first layer TE1 of the driving electrode TE in the third direction (Z-axis direction) may be greater than the thickness of the second layer TE2 of the driving electrode TE in the third direction (Z-axis direction).

In some embodiments, the driving electrode TE of the display device 10 may include side surfaces TE1c facing the touch protection layer 185. The side surfaces TE1c of the driving electrode TE may be in contact with the touch protection layer 185.

In some embodiments, the driving electrode TE is not limited to a double layer structure. Specifically, the driving electrode TE may have a single layer structure, similarly to that illustrated in FIG. 10, or may have a multilayer structure, similarly to that illustrated in FIG. 11. The driving electrode TE may include the same structure and material as the sensing electrode RE. Other redundant descriptions will be omitted.

As described above, the second touch sacrificial layer 184 may include the first portion 184A overlapping the sensing electrode RE, and the second portion 184B overlapping the driving electrode TE.

In some embodiments, the second portion 184B of the second touch sacrificial layer 184 may be disposed to be overlapped with sides of the driving electrode TE. Specifically, the second portion 184B of the second touch sacrificial layer 184 may include a first sub-portion 184B-1 positioned on one side of the driving electrode TE in the first direction (X-axis direction), and a second sub-portion 184B-2 positioned on the other side of the driving electrode TE in the first direction (X-axis direction) in a cross-sectional view. The first sub-portion 184B-1 and the second sub-portion 184B-2 may be spaced apart from each other with the touch contact hole TCNT1 and the driving electrode TE interposed therebetween. Accordingly, the second portion 184B of the second touch sacrificial layer 184 may not overlap the touch contact hole TCNT1.

In some embodiments, the first sub-portion 184B-1 may include a first side surface 184Bc and a second side surface 184Bd. The first side surface 184Bc of the first sub-portion 184B-1 may have an inclined surface. For example, an inclination angle θ3 formed between the touch insulating layer 183 and the first side surface 184Bc may be an acute angle. The first side surface 184Bc of the first sub-portion 184B-1 may be in contact with the touch protection layer 185. In addition, the second side surface 184Bd of the first sub-portion 184B-1 may be a surface facing the first side surface 184Bc and may be in contact with the driving electrode TE.

Although not shown, the second sub-portion 184B-2 included in the second portion 184B of the second touch sacrificial layer 184 may include a first side surface in contact with the touch protection layer 185, and a second side surface in contact with the driving electrode TE. The first side surface of the second sub-portion 184B-2 may have an inclined surface, and for example, an inclination angle formed between the touch insulating layer 183 and the first side surface of the second sub-portion 184B-2 may be an acute angle.

The second touch sacrificial layer 184 may have an etching rate higher than those of the first and second layers TE1 and TE2 of the driving electrode TE, thereby reduce the etching rates of the first and second layers TE1 and TE2 of the driving electrode TE in the wet etching process during the manufacturing process of the display device 10. Accordingly, the etching rate on the side surface TE1c of the driving electrode TE of the display device 10 may decrease. Redundant descriptions will be omitted.

Although not shown, a side surface BE1c of the first connection electrode BE1 included in the display device 10 may be overlapped with the first touch sacrificial layer 182 and the side surface 182c of the first touch sacrificial layer 182 may be overlapped with the touch buffer layer 181 in a plan view. In addition, the side surface TE1c of the driving electrode TE included in the display device 10 may be overlapped with the second portion 184B of the second touch sacrificial layer 184 and the first side surface 184Bc of the second portion 184B may be overlapped with the touch insulating layer 183 in a plan view. This may be the same as the shape shown in FIG. 12 in which the first portion 184A of the second touch sacrificial layer 184 is overlapped with the side surface RE1c of the sensing electrode RE in a plan view, and the touch insulating layer 183 is overlapped with the first portion 184A of the second touch sacrificial layer 184 in a plan view.

Figure 14:
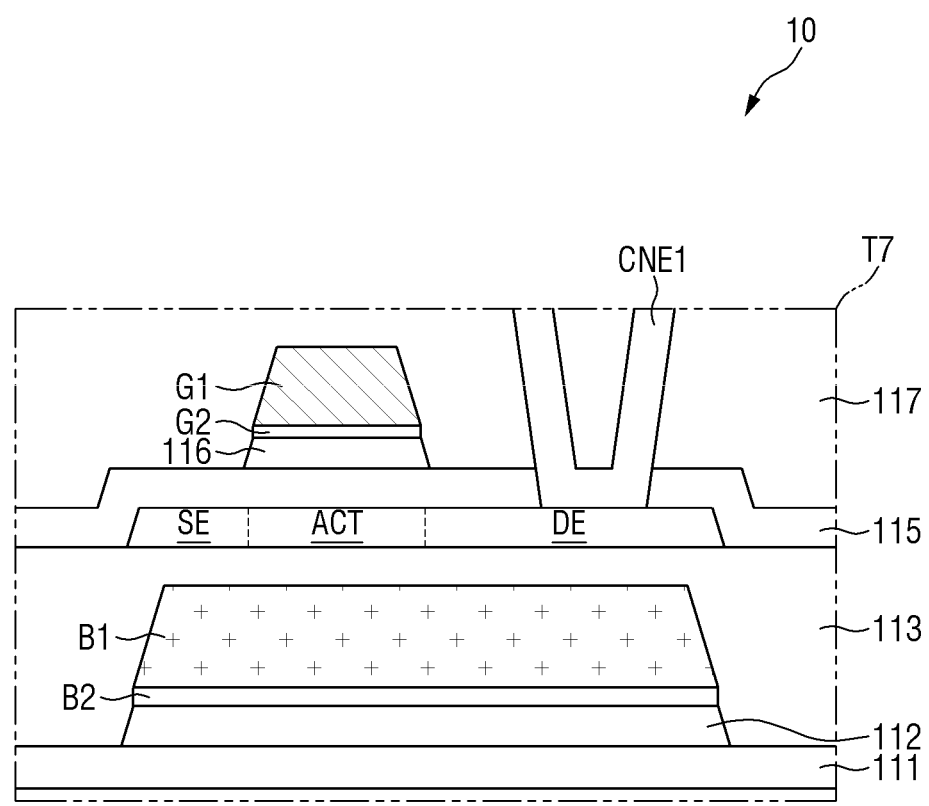
FIG. 14 is an enlarged cross-sectional view of portion 'T7' of FIG. 8.

FIG. 14 is an enlarged cross-sectional view of portion 'T7' of FIG. 8.

Referring to FIG. 14, the first sacrificial layer 112 of the display device 10 may be positioned between the first buffer layer 111 and the lower metal layer BML. The first sacrificial layer 112 may overlap the lower metal layer BML while being in contact with the lower metal layer BML. The first sacrificial layer 112 of the display device 10 may not be positioned in a portion that does not overlap the lower metal layer BML. That is, the first sacrificial layer 112 of the display device 10 may have an island shape while overlapping the lower metal layer BML.

In some embodiments, the first sacrificial layer 112 may be formed on the entire surface of the first buffer layer 111 and then formed in the island shape shown in the drawing by the aforementioned wet etching process.

The first sacrificial layer 112 of the display device 10 may include the same structure and features as the first touch sacrificial layer 182 overlapped with the first connection electrode BE1 of the display device 10, and the second touch sacrificial layer 184 overlapped with the sensing electrode RE of the display device 10. Specifically, the first sacrificial layer 112 may include side surfaces facing the second buffer layer 113, and an inclination angle formed between the first buffer layer 111 and the side surface of the first sacrificial layer may be an acute angle. The side surfaces of the first sacrificial layer 112 may be in contact with the second buffer layer 113. The side surfaces of the first sacrificial layer 112 may be formed to be inclined when as the first sacrificial layer 112 undergoes an etching process.

The lower metal layer BML of the display device 10 may have a double layer structure including a first layer B1 and a second layer B2. The second layer B2 of the lower metal layer BML may be in contact with the first sacrificial layer 112. The second layer B2 of the lower metal layer BML may include metal having an etching rate lower than that of the first sacrificial layer 112. For example, the second layer B2 of the lower metal layer BML may include titanium (Ti) or molybdenum (Mo).

In addition, the first layer B1 of the lower metal layer BML may contact the second layer B2. The first layer B1 of the lower metal layer BML may include metal having an etching rate lower than that of the first sacrificial layer 112. For example, the first layer B1 of the lower metal layer BML may include copper (Cu). The thickness of the first layer B1 of the lower metal layer BML in the third direction (Z-axis direction) may be greater than the thickness of the second layer B2 of the lower metal layer BML.

In some embodiments, the lower metal layer BML is not limited to a double layer structure. Specifically, the lower metal layer BML may be formed in a single layer structure similar to that illustrated in FIG. 10, or may have a multilayer structure similar to that illustrated in FIG. 11. The lower metal layer BML may include the same structure and material as the sensing electrode RE. Other redundant descriptions will be omitted.

The first sacrificial layer 112 may have an etching rate higher than those of the first and second layers B1 and B2 of the lower metal layer BML, thereby reduce the lateral etching rates of the first and second layers B1 and B2 of the lower metal layer BML in the wet etching process during the manufacturing process of the display device 10. Redundant descriptions will be omitted.

As shown in FIG. 14, the second sacrificial layer 116 may be positioned on the gate insulating layer 115. The second sacrificial layer 116 may overlap the gate electrode GE while being in contact with the gate electrode GE. The second sacrificial layer 116 of the display device 10 may not be positioned at a portion that does not overlap the gate electrode GE. That is, the second sacrificial layer 116 of the display device 10 may have an island shape while overlapping the gate electrode GE.

In some embodiments, the second sacrificial layer 116 may be formed on the entire surface of the gate insulating layer 115, and then formed in the island shape shown in the drawing by the aforementioned wet etching process. Exemplarily, when the positions of the lower metal layer BML and the gate electrode GE are the same as in the display device 10, the first sacrificial layer 112 and the second sacrificial layer 116 may overlap in the third direction (Z-axis direction).

The second sacrificial layer 116 may include the same structure and features as the first sacrificial layer 112, the first touch sacrificial layer 182, and the first portion 184A of the second touch sacrificial layer 184 overlapped with the sensing electrode RE in the display device 10. Specifically, the second sacrificial layer 116 may include side surfaces facing the first interlayer insulating layer 117, and an inclination angle formed between the gate insulating layer 115 and the side surface of the second sacrificial layer 116 may be an acute angle. The inclined side surface of the second sacrificial layer 116 may be formed the wet etching process during the manufacturing process.

The gate electrode GE of the display device 10 may be formed in a double layer structure including a first layer G1 and a second layer G2. The second layer G2 of the gate electrode GE may be in contact with the second sacrificial layer 116. The second layer G2 of the gate electrode GE may include metal having an etching rate lower than that of the second sacrificial layer 116. For example, the second layer G2 of the gate electrode GE may include titanium (Ti) or molybdenum (Mo). The first layer G1 of the gate electrode GE may be positioned in contact with the second layer G2.

In addition, the first layer G1 of the gate electrode GE may include metal having an etching rate lower than that of the second sacrificial layer 116. For example, the first layer G1 of the gate electrode GE may include copper (Cu). The thickness of the first layer G1 of the gate electrode GE in the third direction (Z-axis direction) may be greater than the thickness of the second layer G2 of the gate electrode GE.

However, the gate electrode GE is not limited to a double layer structure. Specifically, the gate electrode GE may have a single layer structure similar to that illustrated in FIG. 10, or may have a multilayer structure similar to that illustrated in FIG. 11. The gate electrode GE may have the same structure and material as the sensing electrode RE. Other redundant descriptions will be omitted.

The second sacrificial layer 116 may have an etching rate higher than those of the first and second layers G1 and G2 of the gate electrode GE, thereby reduce the etching rates of the first and second layers G1 and G2 of the gate electrode GE in the wet etching process during the manufacturing process of the display device 10. Accordingly, the lateral etching rate of the gate electrode GE included in the display device 10 may decrease.

Figure 15:
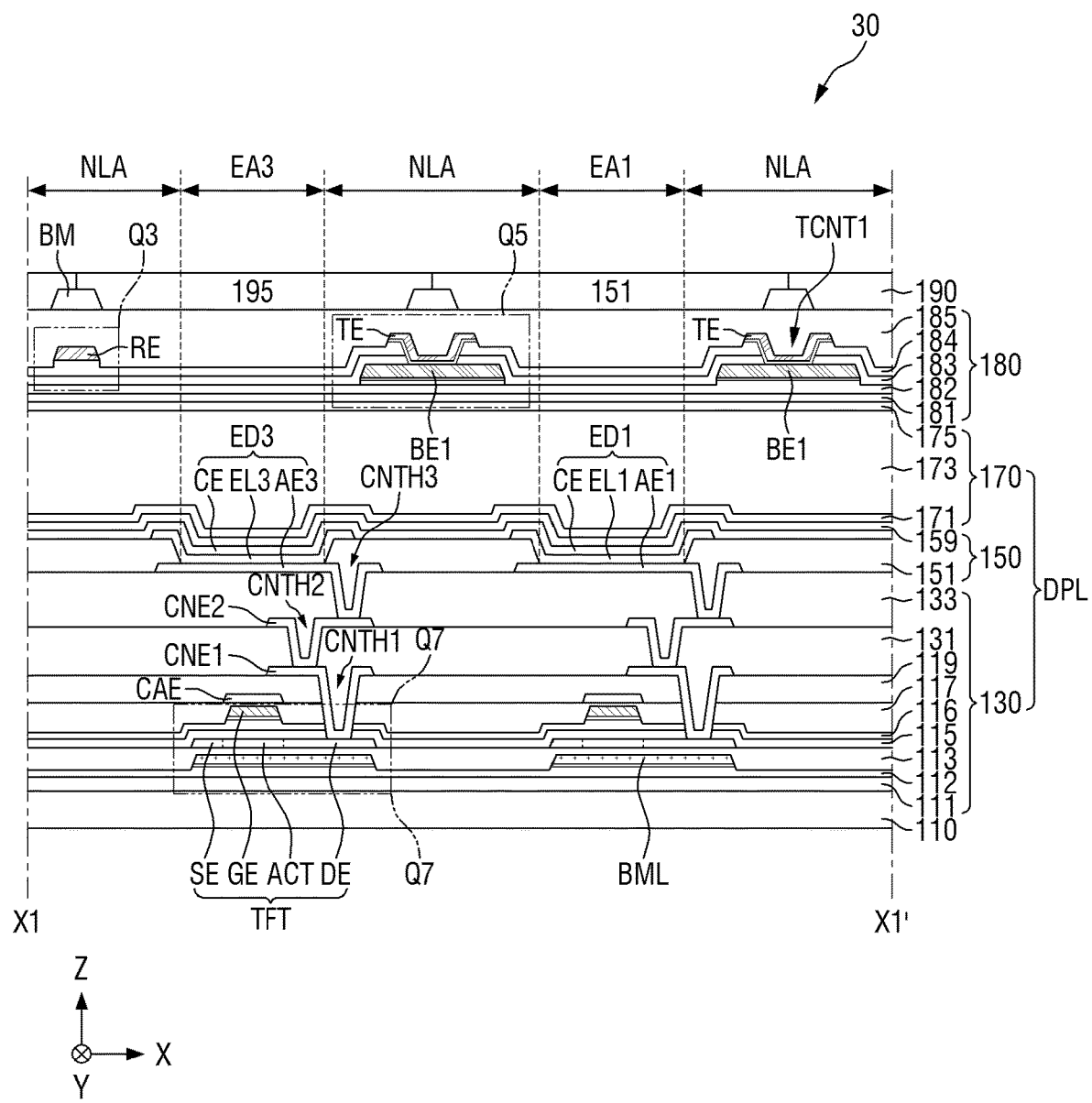
FIG. 15 is a cross-sectional view of a display panel taken along line X1-X1' of FIG. 7 according to another embodiment.

FIG. 15 is a cross-sectional view of a display panel taken along line X1-X1' of FIG. 7 according to another embodiment.

Referring to FIG. 15, a display device 30 differs from the display device 10 in that the first sacrificial layer 112, the second sacrificial layer 116, the first touch sacrificial layer 182, and the second touch sacrificial layer 184 have a structure deposited on the entire surface rather than an island shape. Accordingly, the first sacrificial layer 112, the second sacrificial layer 116, the first touch sacrificial layer 182, and the second touch sacrificial layer 184 of the display device 30 may be positioned to overlap the emission areas EA1, EA2, and EA3 and the non-emission area NLA.

The display device 30 may include the substrate 110, the thin film transistor layer 130, the light emitting element layer 150, the thin film encapsulation layer 170, the touch sensor layer 180, and the color filter layer 190. Redundant descriptions will be omitted.

The first sacrificial layer 112 may be positioned on the first buffer layer 111 in the display device 30. The first sacrificial layer 112 may cover the entire surface of the first buffer layer 111. That is, the first sacrificial layer 112 may be positioned to overlap the emission areas EA1, EA2, and EA3 and the non-emission area NLA. The first sacrificial layer 112 of the display device 30 may include a protruding portion that is overlapped with the lower metal layer BML. This may be caused by etching a part of the top surface of the first sacrificial layer 112 through the wet etching process during the manufacturing process of the display device 30. The structure of the protruding portion of the first sacrificial layer 112 will be described in detail later.

The second buffer layer 113 of the display device 30 may cover the first sacrificial layer 112 and the lower metal layer BML, and the thin film transistor TFT may be positioned on the second buffer layer 113. The second buffer layer 113 of the display device 30 may be disposed in the emission areas EA1, EA2, and EA3 and the non-emission area NLA and may be in contact with the first sacrificial layer 112. The gate insulating layer 115 may be positioned on the second buffer layer 113 and the active layer ACT. Other redundant parts of the description of the display device 10 will be omitted.

The second sacrificial layer 116 may be positioned on the gate insulating layer 115 in the display device 30. The second sacrificial layer 116 may cover the entire surface of the gate insulating layer 115. That is, the second sacrificial layer 116 may be disposed in the emission areas EA1, EA2, and EA3 and the non-emission area NLA. The second sacrificial layer 116 of the display device 30 may include a protruding portion that is overlapped with the gate electrode GE. This may be caused by etching a part of the top surface of the second sacrificial layer 116 through the wet etching process during the manufacturing process of the display device 30. The protruding structure of the second sacrificial layer 116 will be described in detail later.

The gate electrode GE may be positioned on the second sacrificial layer 116 in the display device 30, and the first interlayer insulating layer 117 may be positioned on the gate electrode GE and the second sacrificial layer 116. The first interlayer insulating layer 117 of the display device 30 may be disposed in the emission areas EA1, EA2, and EA3 and the non-emission area NLA and may be in contact with the second sacrificial layer 116. Other redundant parts of the description of the display device 10 will be omitted.

In the touch sensor layer 180 of the display device 30, the first touch sacrificial layer 182 may be positioned on the touch buffer layer 181. The first touch sacrificial layer 182 may cover the entire surface of the touch buffer layer 181. That is, the first touch sacrificial layer 182 may be disposed in the emission areas EA1, EA2, and EA3 and the non-emission area NLA. The first touch sacrificial layer 182 of the display device 30 may include a protruding portion that is overlapped with the first connection electrode BE1. This may be caused by etching a part of the top surface of the first touch sacrificial layer 182 through the wet etching process during the manufacturing process of the display device 30. The protruding structure of the first touch sacrificial layer 182 will be described in detail later.

The touch insulating layer 183 may be positioned on the first connection electrode BE1 and the first touch sacrificial layer 182 in the display device 30. The touch insulating layer 183 of the display device 30 may be disposed in the emission areas EA1, EA2, and EA3 and the non-emission area NLA and may be in contact with the first touch sacrificial layer 182.

The second touch sacrificial layer 184 may be positioned on the touch insulating layer 183 in the display device 30. The second touch sacrificial layer 184 may cover the entire surface of the touch insulating layer 183 except for a portion in which the touch contact hole TCNH1 is formed. That is, the second touch sacrificial layer 184 may be disposed in the emission areas EA1, EA2, and EA3 and the non-emission area NLA.

The second touch sacrificial layer 184 of the display device 30 may include protruding portions overlapped with a part of the driving electrode TE and the sensing electrode RE. This may be caused by etching only a part of the top surface of the second touch sacrificial layer 184 through the wet etching process during the manufacturing process of the display device 30. The protruding structure of the second touch sacrificial layer 184 will be described in detail later.

The touch protection layer 185 may be positioned on the sensing electrode RE, the driving electrode TE, and the second touch sacrificial layer 184 in the display device 30. The touch protection layer 185 of the display device 30 may be disposed in the emission areas EA1, EA2, and EA3 and the non-emission area NLA and may be in contact with the second touch sacrificial layer 184. Other redundant parts of the description of the display device 10 will be omitted.

Figure 16:
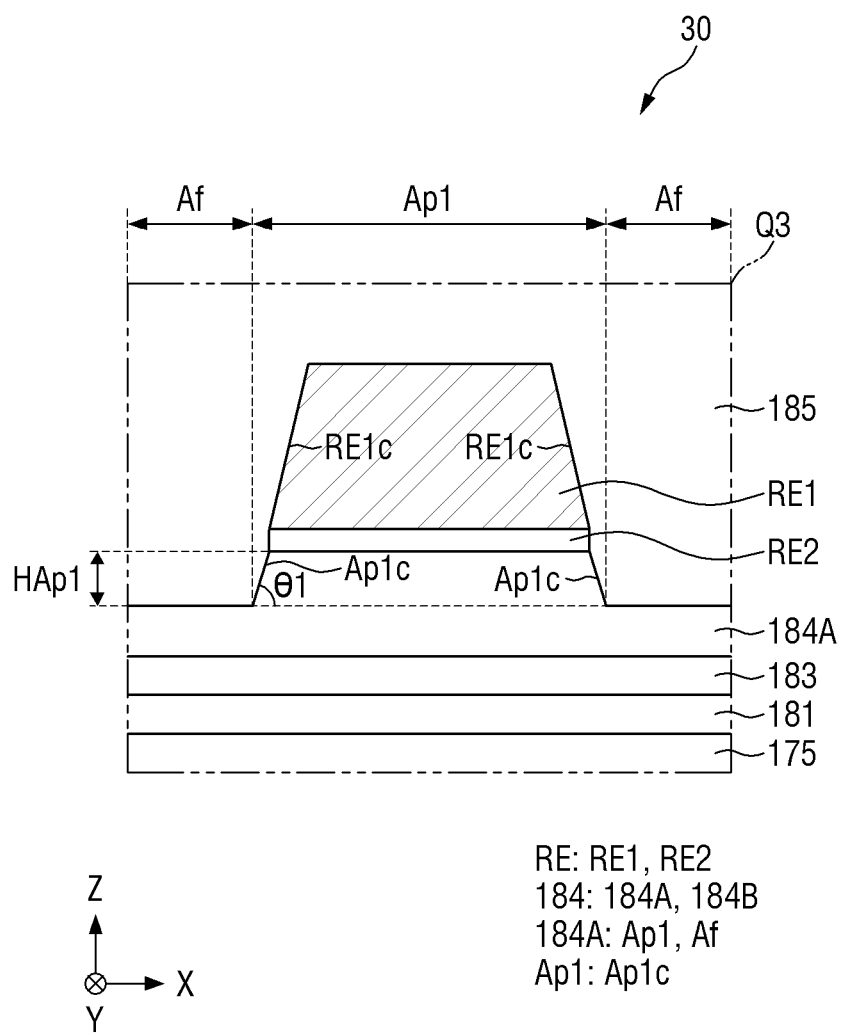
FIG. 16 is an enlarged cross-sectional view of portion 'Q3' of FIG. 15.
Figure 17:
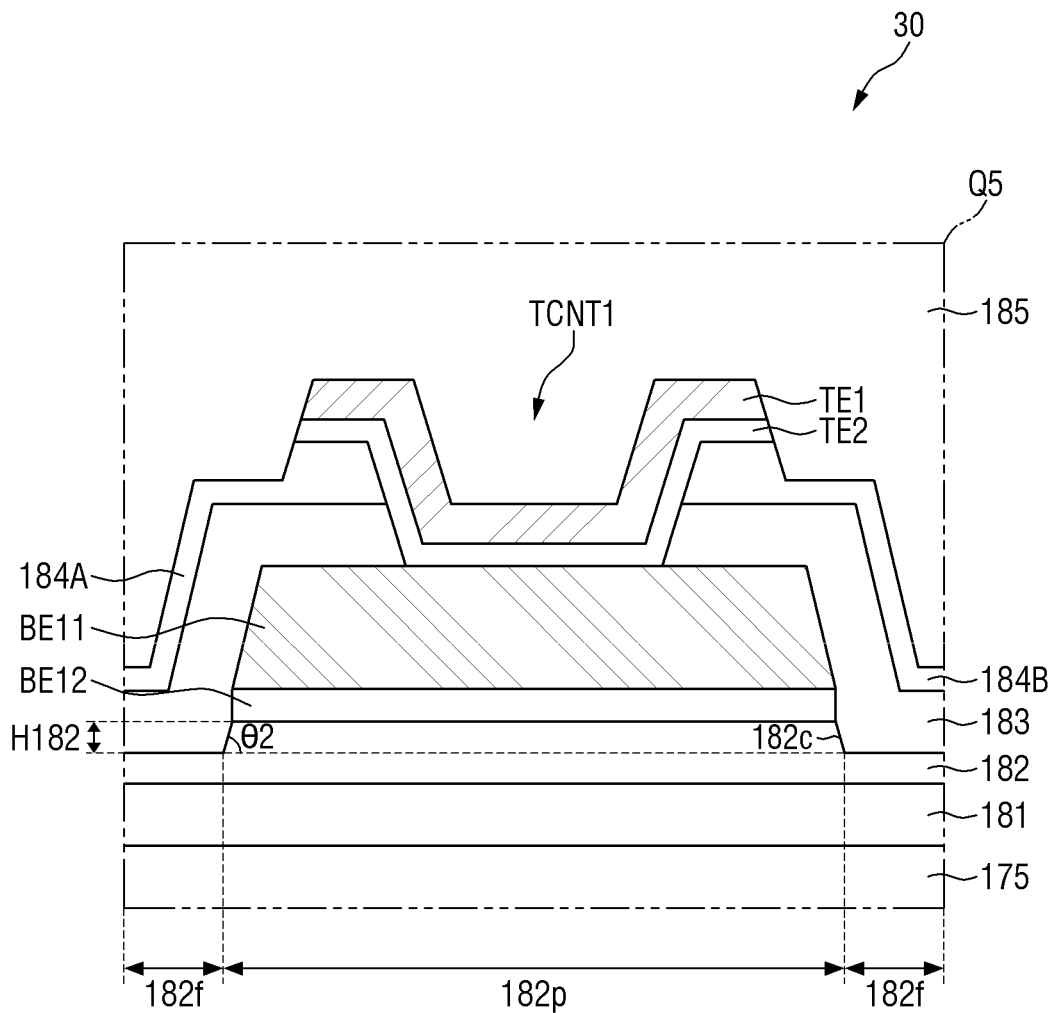
FIG. 17 is an enlarged cross-sectional view of portion 'Q5' of FIG. 15.

FIG. 16 is an enlarged cross-sectional view of portion 'Q3' of FIG. 15. FIG. 17 is an enlarged cross-sectional view of portion 'Q5' of FIG. 15.

Referring to FIGS. 16 and 17, the second touch sacrificial layer 184 of the display device 30 may include a first portion 184A overlapped with the sensing electrode RE, and a second portion 184B overlapped with the driving electrode TE. The first portion 184A included in the second touch sacrificial layer 184 of the display device 30 may differ from that of the display device 10 in that it overlaps the sensing electrode RE and the driving electrode TE.

Referring to FIG. 16, the first portion 184A of the second touch sacrificial layer 184 of the display device 30 may include a protruding portion Ap1 and a flat portion Af.

The flat portion Af of the first portion 184A included in the second touch sacrificial layer 184 may cover the touch insulating layer 183, and be disposed in the emission areas EA1, EA2, and EA3 and the non-emission area NLA. In addition, the protruding portion Ap1 of the first portion 184A may be overlapped with the sensing electrode RE and may protrude in the third direction (Z-axis direction) beyond the flat portion Af of the first portion 184A.

In some embodiments, the protruding portion Ap1 included in the first portion 184A of the display device 30 may be in contact with the sensing electrode RE. The protruding portion Ap1 of the first portion 184A may be formed by forming the second touch sacrificial layer 184 on the entire surface of the touch insulating layer 183, and then etching a part of the top surface of the second touch sacrificial layer 184 through the aforementioned wet etching process. Accordingly, a height HAp1 of the protruding portion Ap1 may be adjusted depending on the wet etching time in the wet etching process in the manufacturing process of the display device 30. In other words, in the wet etching process in the manufacturing process of the display device 30, as the wet etching time increases, the height HAp1 of the protruding portion Ap1 may increase. The protruding portion Ap1 included in the first portion 184A of the display device 30 may be formed only in a portion overlapping the sensing electrode RE. Accordingly, the protruding portion Ap1 may be positioned to protrude in an island shape.

In some embodiments, the protruding portion Ap1 of the first portion 184A may include side surfaces Ap1c facing the touch protection layer 185. The side surfaces Ap1c of the protruding portion Ap1 may have inclined surfaces. The inclined side surface Ap1c of the protruding portion Ap1 may be formed by the wet etching process. For example, an inclination angle θ1 formed between the side surface Ap1c of the protruding portion Ap1 and its lower structure may be an acute angle.

The etching rate of the second touch sacrificial layer 184 included in the display device 30 may be relatively higher than that of the sensing electrode RE. Therefore, in the wet etching process during the manufacturing process, the second touch sacrificial layer 184 of the display device 30 may react more with the hydrofluoric acid-based etching solution than the sensing electrode RE, thereby reduce the etching rate of the sensing electrode RE. Redundant parts of the above description will be omitted.

The sensing electrode RE of the display device 30 may have a double layer structure including a first layer RE1 and a second layer RE2. The second layer RE2 of the sensing electrode RE may be in contact with the protruding portion Ap1 of the second touch sacrificial layer 184. The first layer RE1 of the sensing electrode RE may be positioned in contact with the second layer RE2. The first layer RE1 and the second layer RE2 of the sensing electrode RE may include metal having an etching rate lower than that of the second touch sacrificial layer 184. For example, the first layer RE1 of the sensing electrode RE may include copper (Cu).

In some embodiments, the first layer RE1 of the sensing electrode RE included in the display device 30 may include side surfaces RE1c facing the touch protection layer 185. The side surfaces RE1c of the sensing electrode RE included in the display device 30 may be in contact with the touch protection layer 185.

In the drawing, the sensing electrode RE included in the display device 30 is shown as having a double layer structure, but is not limited thereto. That is, the sensing electrode RE included in the display device 30 may be formed in a single layer or multilayer structure. Other redundant descriptions will be omitted.

Referring to FIG. 17, the first touch sacrificial layer 182 of the display device 30 may include a protruding portion 182p and a flat portion 182f.

The flat portion 182f of the first touch sacrificial layer 182 included in the display device 30 may cover the touch buffer layer 181 and be disposed in the emission areas EA1, EA2, and EA3 and the non-emission area NLA. In addition, the protruding portion 182p of the first touch sacrificial layer 182 may be overlapped with the first connection electrode BE1, and may protrude in the third direction (Z-axis direction) beyond the flat portion 182f of first touch sacrificial layer 182.

In some embodiments, the protruding portion 182p of the first touch sacrificial layer 182 included in the display device 30 may be in contact with the first connection electrode BE1. The protruding portion 182p of the first touch sacrificial layer 182 may be formed by forming the first touch sacrificial layer 182 on the entire surface of the touch buffer layer 181, and then etching a part of the top surface of the first touch sacrificial layer 182 through the aforementioned wet etching process. A height H182 of the protruding portion 182p of the first touch sacrificial layer 182 may be adjusted the wet etching time in the wet etching process in the manufacturing process of the display device 30. In other words, in the wet etching process in the manufacturing process of the display device 30, as the wet etching time increases, the height H182 of the protruding portion 182p may increase. The protruding portion 182p included in the first touch sacrificial layer 182 of the display device 30 may be formed only in a portion overlapping the first connection electrode BE1. Accordingly, the protruding portion 182p included in the first touch sacrificial layer 182 may be positioned to protrude in an island shape.

In some embodiments, the protruding portion 182p of the first touch sacrificial layer 182 may include a side surface 182c facing the touch insulating layer 183. The side surface 182c of the protruding portion 182p may be an inclined surface. The inclined side surface 182c of the protruding portion 182p may be formed by the wet etching process. For example, an inclination angle θ2 formed between the side surface 182c of the protruding portion 182p and its lower structure may be an acute angle. The side surface 182c of the protruding portion 182p may be in contact with the touch insulating layer 183.

The etching rate of the first touch sacrificial layer 182 included in the display device 30 may be relatively higher than that of the first connection electrode BE1. Accordingly, in the wet etching process during the manufacturing process, the first touch sacrificial layer 182 of the display device 30 may react more with the hydrofluoric acid-based etching solution than the first connection electrode BE1, thereby reduce in the etching rate of the first connection electrode BE1.

In addition, the first connection electrode BE1 included in the display device 30 is shown as having a double layer structure, but is not limited thereto. That is, the first connection electrode BE1 included in the display device 30 may have a single layer or multilayer structure. Other redundant descriptions will be omitted.

The driving electrode TE of the display device 30 may be electrically connected to the first connection electrode BE1 through the touch contact hole TCNT1. The touch insulating layer 183 and the second touch sacrificial layer 184 positioned between the driving electrode TE and the first connection electrode BE1 in the display device 30 may be removed to form the touch contact hole TCNT1. Accordingly, the second touch sacrificial layer 184 may include the first portion 184A positioned on one side of the driving electrode TE in the first direction (X-axis direction), and the second portion 184B positioned on the other side of the driving electrode TE in the first direction (X-axis direction) in a cross-sectional view.

In some embodiments, the first portion 184A of the second touch sacrificial layer 184 included in the display device 30 may be a portion extending from the non-emission area NLA where the sensing electrode RE is positioned to the non-emission area NLA where the driving electrode TE is positioned. That is, the first portion 184A of the second touch sacrificial layer 184 included in the display device 30 may be overlapped with the sensing electrode RE and the driving electrode TE.

Figure 18:
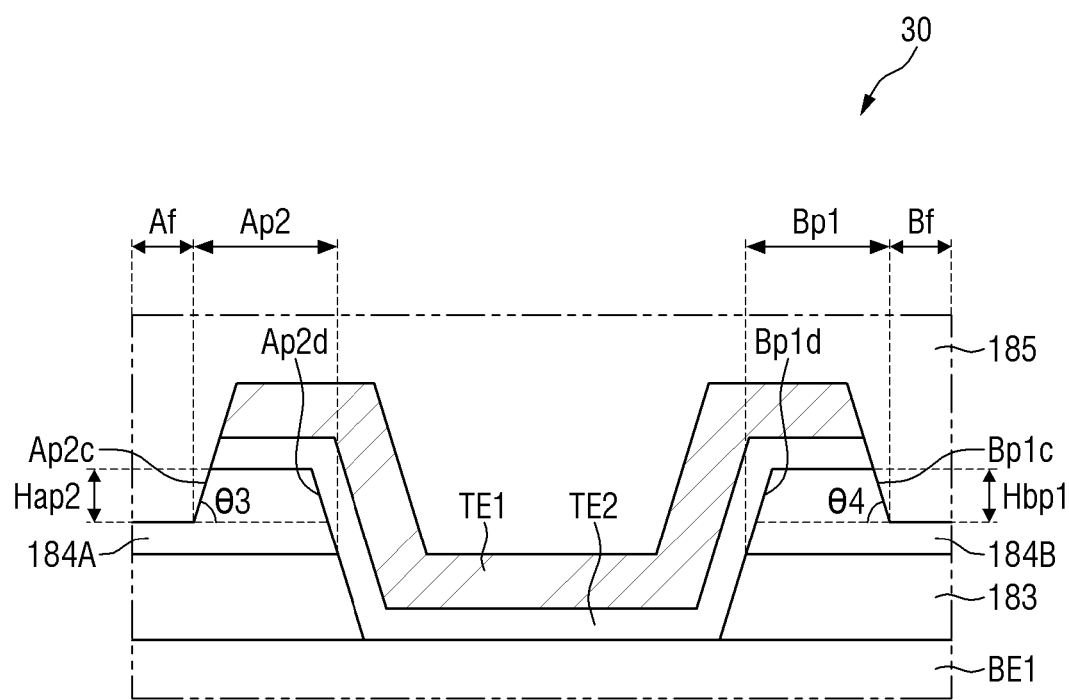
FIG. 18 is an enlarged cross-sectional view of the driving electrode of FIG. 17.

FIG. 18 is an enlarged cross-sectional view of the driving electrode TE of FIG. 17.

Referring to FIG. 18, the first portion 184A of the second touch sacrificial layer 184 positioned on one side of the driving electrode TE in the first direction (X-axis direction) while overlapped with the driving electrode TE of the display device 30 may include a flat portion Af and a protruding portion Ap2.

In some embodiments, the flat portion Af of the first portion 184A included in the display device 30 may extend from the aforementioned flat portion Af of the first portion 184A overlapping the sensing electrode RE, and may be integral with the aforementioned flat portion Af.

In addition, the protruding portion Ap2 of the first portion 184A included in the display device 30 may be a portion overlapped with the one side of the driving electrode TE in the first direction (X-axis direction). The protruding portion Ap2 may be formed in a shape shown in the drawing by forming the second touch sacrificial layer 184 on the entire surface of the touch insulating layer 183 and then etching it through the aforementioned wet etching process. A height Hap2 of the protruding portion Ap2 of the first portion 184A may vary depending on the etching time in the wet etching process in the manufacturing process of the display device 30. In other words, in the wet etching process in the manufacturing process of the display device 30, as the wet etching time increases, the height Hap2 of the protruding portion Ap2 may increase.

In some embodiments, the protruding portion Ap2 of the first portion 184A may include a first side surface Ap2c and a second side surface Ap2d. The first side surface Ap2c of the protruding portion Ap2 may have an inclined surface. For example, an inclination angle θ3 formed between the first side surface Ap2c of the protruding portion Ap2 and its lower structure may be an acute angle. The presence of the protruding portion Ap2 of the first portion 184A including the inclined first side surface Ap2c may be caused by the etching process in the manufacturing process. The first side surface Ap2c of the protruding portion Ap2 may be in contact with the touch protection layer 185. In addition, the second side surface Ap2d of the protruding portion Ap2 may be a surface facing the first side surface Ap2c and may be in contact with the driving electrode TE.

In some embodiments, the protruding portion Ap1 of the first portion 184A overlapped with the sensing electrode RE may be positioned in a different non-emission area NLA from the protruding portion Ap2 of the first portion 184A overlapped with the driving electrode TE. The protruding portion Ap1 and the protruding portion Ap2 of the first portion 184A may be connected to each other through the flat portion Af of the first portion 184A.

In some embodiments, the second portion 184B of the second touch sacrificial layer 184 positioned on one side of the driving electrode TE in the first direction (X-axis direction) while overlapped with the driving electrode TE may include a flat portion Bf and a protruding portion Bp1. The flat portion Bf and the protruding portion Bp1 of the second portion 184B may be spaced apart from the flat portion Af and the protruding portion Ap2 of the first portion 184A due to the touch contact hole TCNT1 in a cross-sectional view.

In some embodiments, the protruding portion Bp1 of the second portion 184B may be formed in a shape shown in the drawing by forming the second touch sacrificial layer 184 on the entire surface of the touch insulating layer 183 and then etching it through the aforementioned wet etching process. A height Hbp1 of the protruding portion Bp1 of the second portion 184B may vary depending on the etching time in the wet etching process in the manufacturing process of the display device 30. In other words, in the wet etching process in the manufacturing process of the display device 30, as the wet etching time increases, the height Hbp1 of the protruding portion Bp1 may increase.

In some embodiments, the protruding portion Bp1 of the second portion 184B may include a first side surface Bp1c and a second side surface Bp1d. The first side surface Bp1c of the protruding portion Bp1 may have an inclined surface. For example, an inclination angle θ4 formed between the first side surface Bp1c of the protruding portion Bp1 and its lower structure may be an acute angle. The presence of the protruding portion Bp1 of the second portion 184B including the inclined first side surface Bp1c may be caused by the etching process in the manufacturing process. The first side surface Bp1c of the protruding portion Bp1 may be in contact with the touch protection layer 185. In addition, the second side surface Bp1d of the protruding portion Bp1 may be a surface facing the first side surface Bp1c and may be in contact with the driving electrode TE.

As described above, the etching rate of the second touch sacrificial layer 184 included in the display device 30 may be relatively higher than that of the driving electrode TE. Therefore, in the wet etching process during the manufacturing process, the second touch sacrificial layer 184 of the display device 30 may react more with the hydrofluoric acid-based etching solution than the driving electrode TE, thereby reduce the etching rate of the driving electrode TE. Redundant descriptions will be omitted.

In some embodiments, the driving electrode TE included in the display device 30 is shown as having a double layer structure, but is not limited thereto. That is, the driving electrode TE included in the display device 30 may have a single layer or multilayer structure. Other redundant descriptions will be omitted.

Figure 19:
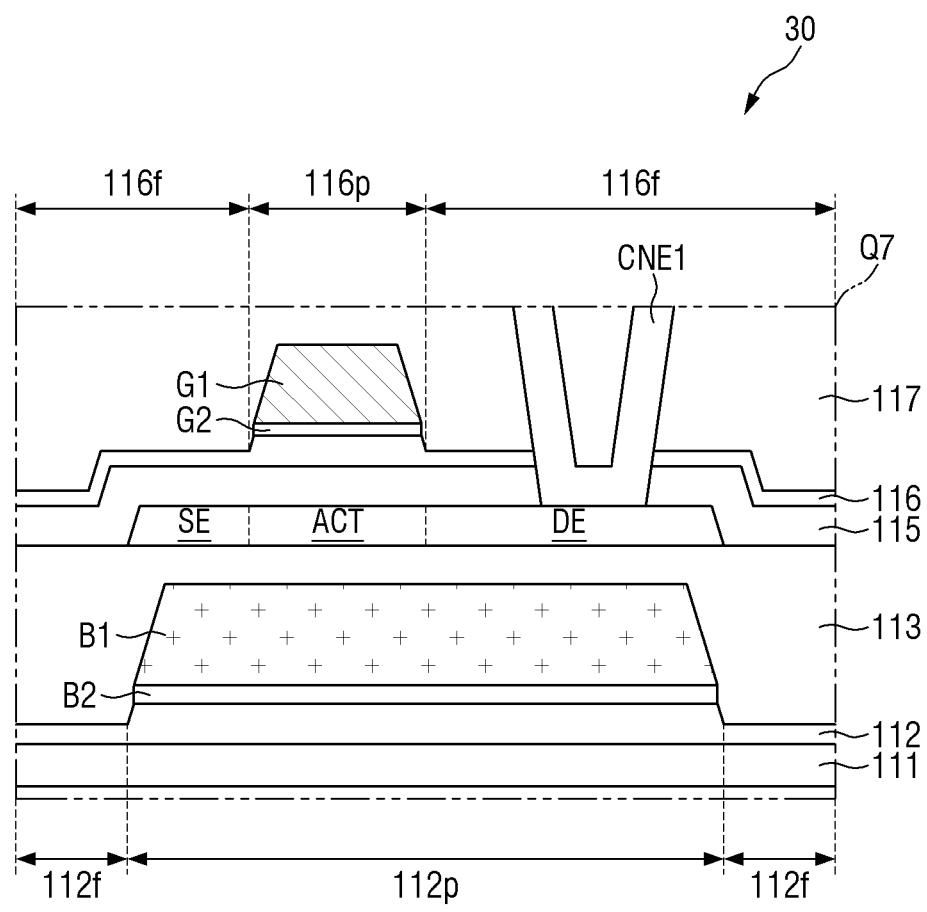
FIG. 19 is an enlarged cross-sectional view of portion 'Q7' of FIG. 15.

FIG. 19 is an enlarged cross-sectional view of portion 'Q7' of FIG. 15.

Referring to FIG. 19, the first sacrificial layer 112 of the display device 30 may include a protruding portion 112p and a flat portion 112f. The flat portion 112f of the first sacrificial layer 112 may be disposed in the emission areas EA1, EA2, and EA3 and the non-emission area NLA and may be positioned in contact with the first buffer layer 111. In addition, the protruding portion 112p of the first sacrificial layer 112 may ne overlapped with the lower metal layer BML while being in contact with the lower metal layer BML. The protruding portion 112p of the first sacrificial layer 112 may be formed in a shape shown in the drawing by forming the first sacrificial layer 112 on the entire surface of the first buffer layer 111 and then etching a part of the top surface of the first sacrificial layer 112 through the aforementioned wet etching process. The height of the protruding portion 112p of the first sacrificial layer 112 may vary depending on the etching time in the wet etching process in the manufacturing process of the display device 30.

As described above, the etching rate of the first sacrificial layer 112 included in the display device 30 may be relatively higher than that of the lower metal layer BML. Therefore, in the wet etching process during the manufacturing process, the first sacrificial layer 112 of the display device 30 may react more with the hydrofluoric acid-based etching solution than the lower metal layer BML, thereby reduce the etching rate of the lower metal layer BML.

In some embodiments, the lower metal layer BML included in the display device 30 is shown as having a double layer structure, but is not limited thereto. That is, the lower metal layer BML included in the display device 30 may have a single layer or multilayer structure. Other redundant descriptions will be omitted.

In addition, the second sacrificial layer 116 overlapping the gate electrode GE in the display device 30 may include a protruding portion 116p and a flat portion 116f. The flat portion 116f of the second sacrificial layer 116 may be disposed in the emission areas EA1, EA2, and EA3 and the non-emission area NLA and may be positioned in contact with the gate insulating layer 115. In addition, the protruding portion 116p of the second sacrificial layer 116 may be overlapped with the gate electrode GE while being in contact with the gate electrode GE. The protruding portion 116p of the second sacrificial layer 116 may be formed in a shape shown in the drawing by forming the second sacrificial layer 116 on the entire surface of the gate insulating layer 115 and then removing a part of the top surface of the second sacrificial layer 116 through the aforementioned wet etching process. The height of the protruding portion 116p of the second sacrificial layer 116 may vary depending on the etching time in the wet etching process in the manufacturing process of the display device 30.

As described above, the etching rate of the second sacrificial layer 116 included in the display device 30 may be relatively higher than that of the gate electrode GE. Therefore, in the wet etching process during the manufacturing process, the second sacrificial layer 116 of the display device 30 may react more with the hydrofluoric acid-based etching solution than the gate electrode GE, thereby reduce the etching rate of the gate electrode GE.

In some embodiments, the gate electrode GE included in the display device 30 is shown as having a double layer structure, but is not limited thereto. That is, the gate electrode GE included in the display device 30 may have a single layer or multilayer structure. Other redundant descriptions will be omitted.

Figure 20:
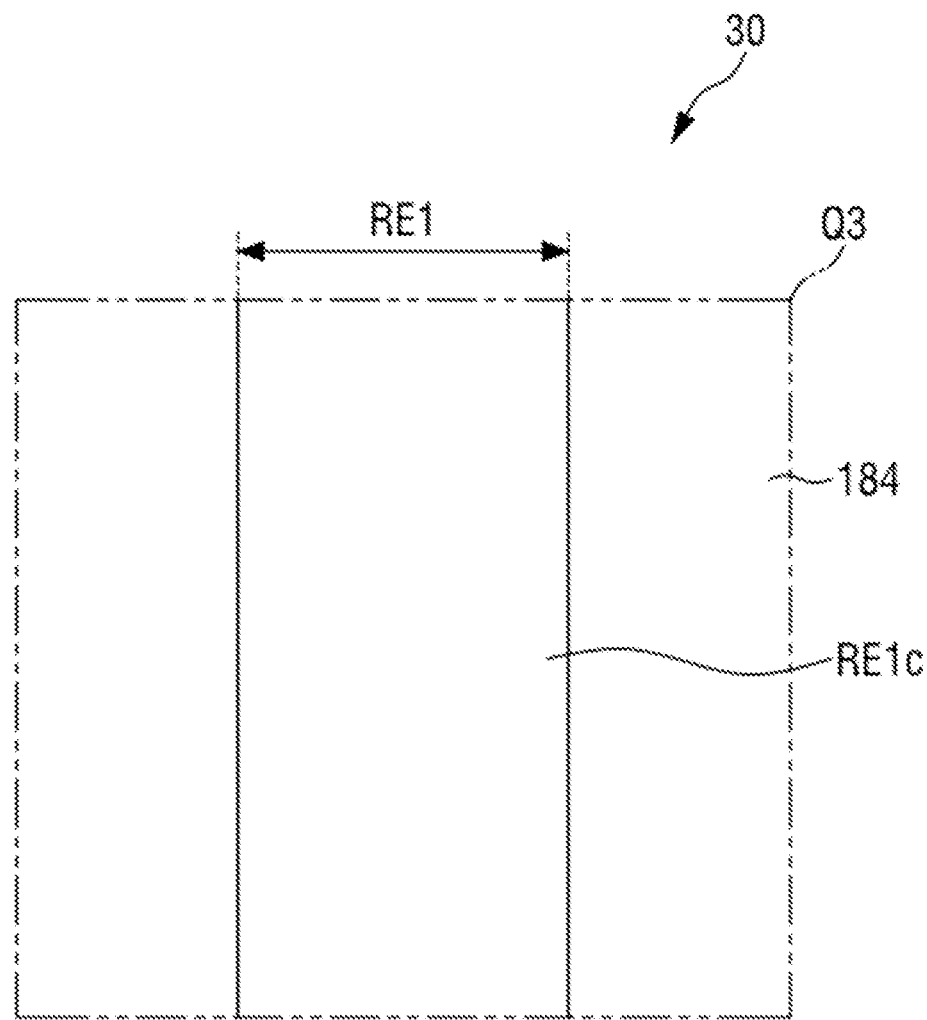
FIG. 20 is an enlarged plan view of portion 'Q3' of FIG. 15.

FIG. 20 is an enlarged plan view of portion 'Q3' of FIG. 15.

Referring to FIG. 20, in a plan view, the side surface RE1c of the first layer RE1 of the sensing electrode RE in the display device 30 may be completely overlapped with the second touch sacrificial layer 184. The planar structure of the display device 30 differs from that of another embodiment (the display device 10) in that the second touch sacrificial layer 184 is disposed on the entire surface. For simplicity of description, the sensing electrode RE is illustrated and described as an example, but the metal wiring included in the display device 30 may all have the same structure.

In concluding the detailed description, those skilled in the art will appreciate that many variations and modifications can be made to the embodiments without substantially departing from the principles of the inventive concept. Therefore, the disclosed embodiments of the inventive concept are used in a generic and descriptive sense only and not for purposes of limitation.

What is claimed is:

1. A display device comprising:
    a substrate comprising an emission area and a non-emission area;
    a thin film transistor layer positioned on the substrate;
    a touch buffer layer positioned on the thin film transistor layer;
    a connection electrode positioned on the touch buffer layer;
    a touch insulating layer positioned on the connection electrode;
    a first electrode positioned on the touch insulating layer, and overlapping the non-emission area; and
    a first touch sacrificial layer positioned between the touch insulating layer and the first electrode,
    wherein the first touch sacrificial layer does not overlap the emission area and is positioned in an island shape while overlapping the non-emission area,
    wherein an inclination angle formed between the touch insulating layer and a side surface of the first touch sacrificial layer has an acute angle,
    wherein the touch insulating layer and the first touch sacrificial layer are disposed between the connection electrode and the first electrode,
    wherein the touch insulating layer and the first touch sacrificial layer include inorganic insulating material,
    wherein the first touch sacrificial layer further comprises a first surface facing the touch insulating layer and a second surface facing the first electrode, and
    wherein the first surface is in contact with the touch insulating layer and the second surface is in contact with the first electrode.

2. The display device of claim 1, further comprising a touch protection layer positioned on the first electrode,
    wherein the side surface of the first touch sacrificial layer is in contact with the touch protection layer.

3. The display device of claim 2, wherein the first touch sacrificial layer is at least one selected from the group consisting of silicon nitride, silicon oxynitride, and silicon oxide.

4. The display device of claim 2, wherein the first electrode includes at least one of conductive layer, and
    wherein the first electrode contains copper.

5. The display device of claim 1, wherein the first electrode is completely overlapped with the first touch sacrificial layer in a plan view, and
    wherein the first touch sacrificial layer is completely overlapped with the touch insulating layer in a plan view.

6. The display device of claim 5, wherein the first electrode and the first touch sacrificial layer have a mesh shape to expose the emission area in a plan view.

7. The display device of claim 1, further comprising a second electrode positioned on the touch insulating layer in the non-emission area and spaced apart from the first electrode with the emission area interposed therebetween,
    wherein the second electrode is electrically connected to the connection electrode through a touch contact hole.

8. The display device of claim 7, wherein the first touch sacrificial layer comprises a first portion overlapped with the first electrode and a second portion overlapped with the second electrode, and
    wherein the second portion of the first touch sacrificial layer has an island shape between the second electrode and the touch insulating layer.

9. The display device of claim 8, wherein the second portion of the first touch sacrificial layer completely surrounds the touch contact hole in a plan view.

10. The display device of claim 8, wherein the second portion is not positioned on the touch contact hole.

11. The display device of claim 1, further comprising a second touch sacrificial layer positioned between the touch buffer layer and the connection electrode,
    wherein the second touch sacrificial layer is in contact with the touch buffer layer and the connection electrode,
    wherein the second touch sacrificial layer is positioned in an island shape while overlapped with the connection electrode, and
    wherein an inclination angle formed between the touch buffer layer and a side surface of the second touch sacrificial layer has an acute angle.

12. The display device of claim 11, wherein the connection electrode is completely overlapped with the second touch sacrificial layer, and
    wherein the second touch sacrificial layer is completely overlapped with the touch buffer layer.

13. The display device of claim 1, wherein the thin film transistor layer comprises:
    a first buffer layer;
    a third electrode positioned on the first buffer layer; and
    a first sacrificial layer positioned between the first buffer layer and the third electrode, wherein an inclination angle formed between the first buffer layer and a side surface of the first sacrificial layer has an acute angle.

14. The display device of claim 13, wherein the first sacrificial layer has an island shape while overlapped with the third electrode.

15. A display device comprising:
a substrate comprising an emission area and a non-emission area;
a thin film transistor layer positioned on the substrate;
a touch buffer layer positioned on the thin film transistor layer;
a connection electrode positioned on the touch buffer layer;
a touch insulating layer positioned on the connection electrode;
a first electrode positioned on the touch insulating layer and overlapping the non-emission area;
a touch protection layer positioned on the first electrode; and
a first touch sacrificial layer positioned between the touch insulating layer and the first electrode,
wherein the first touch sacrificial layer comprises a first portion overlapping the emission area and the non-emission area and a second portion overlapping the first electrode and protruding toward the first electrode.

16. The display device of claim 15, wherein the second portion of the first touch sacrificial layer is in contact with the first electrode.

17. The display device of claim 16, wherein the second portion comprises side surfaces facing the touch protection layer, and
wherein an inclination angle formed between a side surface of the second portion of the first touch sacrificial layer and the touch insulating layer has an acute angle.

18. The display device of claim 17, further comprising a second electrode positioned on the touch insulating layer in the non-emission area and spaced apart from the first electrode with the emission area interposed therebetween,
wherein the first touch sacrificial layer further comprises a third portion overlapping the second electrode and protruding toward the second electrode, and
wherein an inclination angle formed between a side surface of the third portion facing the touch protection layer and the touch insulating layer has an acute angle.

19. The display device of claim 18, wherein the second portion and the third portion overlap the non-emission area and are spaced apart from each other with the emission area interposed therebetween, and
wherein the second portion and the third portion are connected by the first portion.

* * * * *